United States Patent
Masuda et al.

(10) Patent No.: US 9,246,413 B2
(45) Date of Patent: Jan. 26, 2016

(54) ULTRASONIC MOTOR

(75) Inventors: Kentaro Masuda, Tokyo (JP); Motomi Takahashi, Tokyo (JP)

(73) Assignee: Sumida Corporation (JP)

( * ) Notice: Subject to any disclaimer, the term of this patent is extended or adjusted under 35 U.S.C. 154(b) by 400 days.

(21) Appl. No.: 13/821,405

(22) PCT Filed: Sep. 1, 2011

(86) PCT No.: PCT/JP2011/004915
§ 371 (c)(1),
(2), (4) Date: Mar. 7, 2013

(87) PCT Pub. No.: WO2012/056620
PCT Pub. Date: May 3, 2012

(65) Prior Publication Data
US 2013/0162104 A1 Jun. 27, 2013

(30) Foreign Application Priority Data

Oct. 27, 2010 (JP) ................................. 2010-240269

(51) Int. Cl.
*H02N 2/00* (2006.01)
*H01L 41/09* (2006.01)
*H02N 2/02* (2006.01)

(52) U.S. Cl.
CPC ............. *H02N 2/0025* (2013.01); *H02N 2/001* (2013.01); *H02N 2/0075* (2013.01); *H02N 2/026* (2013.01)

(58) Field of Classification Search
USPC ............. 310/323.01, 323.02, 323.09, 323.13, 310/323.16
See application file for complete search history.

(56) References Cited

U.S. PATENT DOCUMENTS

| 4,742,260 A | * | 5/1988 | Shimizu et al. ........... 310/323.16 |
| 4,937,589 A | * | 6/1990 | Fagerquist et al. ............. 347/75 |
| 7,586,237 B2 | | 9/2009 | Hashimoto |
| 7,598,656 B2 | * | 10/2009 | Wischnewskij et al. . 310/323.01 |
| 2002/0074901 A1 | * | 6/2002 | Johansson ....................... 310/328 |
| 2004/0070887 A1 | * | 4/2004 | Yao et al. ................... 360/294.4 |
| 2007/0182281 A1 | * | 8/2007 | Mori .............................. 310/317 |
| 2007/0188050 A1 | | 8/2007 | Hashimoto |

(Continued)

FOREIGN PATENT DOCUMENTS

| CN | 101652921 A | 2/2010 |
| JP | 3-256579 A | 11/1991 |

(Continued)

*Primary Examiner* — Thomas Dougherty
(74) *Attorney, Agent, or Firm* — Harness, Dickey & Pierce, P.L.C.

(57) ABSTRACT

An ultrasonic motor (10) includes a vibrator (50) and an application means (oscillation circuit 80). A first vibrator area (51) and a second vibrator area (52), which form a vibrator (50), include piezoelectric elements polarized in the thickness direction, and fixed portions (30*a*, 30*b*) respectively. The oscillation circuit 80 applies an AC voltage to the piezoelectric elements respectively and makes the first vibrator area (51) and the second vibrator area (52) resonate individually in the surface-spreading directions. The ultrasonic motor (10) includes a coupling portion (55) for coupling vibration end portions (23*a*, 23*b*) each other and a contact element (60) which is provided on this coupling portion (55). The vibration end portions (23*a*, 23*b*) are positions which vibrate respectively in the approaching and separating directions by the resonances of the first vibrator area (51) and the second vibrator area (52) in the surface-spreading directions with respect to the fixed portions (30*a*, 30*b*).

20 Claims, 18 Drawing Sheets

(56) References Cited

U.S. PATENT DOCUMENTS

| | | |
|---|---|---|
| 2010/0149665 A1 | 6/2010 | Fujiwara et al. |
| 2012/0169181 A1* | 7/2012 | Lee et al. .................. 310/323.16 |
| 2012/0228994 A1* | 9/2012 | Wischnewskiy et al. ..... 310/317 |

FOREIGN PATENT DOCUMENTS

| | | |
|---|---|---|
| JP | 7-184382 A | 7/1995 |
| JP | 10-225151 A | 8/1998 |
| JP | 2001-086774 A | 3/2001 |
| JP | 2002-223577 A | 8/2002 |
| JP | 2005-261067 A | 9/2005 |
| JP | 2007-221865 A | 8/2007 |
| JP | 2009-27775 A | 2/2009 |
| JP | 2009-232642 A | 10/2009 |
| JP | 2009-240149 A | 10/2009 |
| JP | 2010-158143 A | 7/2010 |

* cited by examiner

ULTRASONIC MOTOR

CROSS-REFERENCE TO RELATED APPLICATIONS

This application is a National Stage of International Application No. PCT/JP2011/004915, filed Sep. 1, 2011, and published in Japanese as WO 2012/056620 A1 on May 3, 2012. This application claims the benefit and priority of Japanese Application No. 2010-240269, filed Oct. 27, 2010. The entire disclosures of the above applications are incorporated herein by reference.

TECHNICAL FIELD

The present invention relates to an ultrasonic motor which drives a movable element by using a piezoelectric vibrator.

BACKGROUND ART

In recent years, there has been proposed an ultrasonic motor which moves a small-sized movable element of a lens or the like in high-accuracy by using a minute vibration of a piezoelectric element as a driving source.

Relating to these kinds of ultrasonic motors, in Japanese unexamined patent publication H7-184382, there is described a technology in which a rectangular piezoelectric element is divided equally into four portion-areas by orthogonal two line segments parallel to the sides thereof and electrodes are respectively provided thereon and concurrently, an asymmetric unipolar pulse voltage is electrically-conducted by changing-over those electrodes. As compared in FIG. 3 and FIG. 5 of H7-184382, this ultrasonic motor reverses the resonance direction of the piezoelectric element for the right and left directions by changing-over the selection of the diagonal two electrodes to be conducted with the pulse voltage. Then, as shown in FIG. 7 of H7-184382, this ultrasonic motor bending-vibrates such that the long side of the rectangular piezoelectric element will be bent.

DISCLOSURE OF THE INVENTION

Problem to be Solved by the Invention

The ultrasonic motor described in H7-184382 is a motor having a drive principle in which the distortion of the active area resonating by being applied with a pulse voltage is exerted to the opened area neighboring to the active area and the bending-vibration of the piezoelectric element is to be excited. For this reason, there occurs a phenomenon in which the deformation of the active area is necessarily suppressed by the rigidity of the neighboring opened area and there is such a problem that the impedance of the ultrasonic motor is large and the energy conversion efficiency becomes low.

The present invention was invented in view of the problem mentioned above and provides an ultrasonic motor in which the amount of displacement of the driven movable element is large and the energy conversion efficiency is high.

Means for Solving the Problem

An ultrasonic motor of the present invention is characterized by comprising: a first vibrator area and a second vibrator area each of which includes a piezoelectric element polarized in the thickness direction and a fixed portion; application means for applying AC voltage to the piezoelectric elements respectively and for resonating the first vibrator area and the second vibrator area individually toward the surface-spreading directions thereof; a coupling portion for coupling the first vibrator area and the second vibrator area; and a contact element provided at the coupling portion, wherein the first vibrator area includes a first vibrating position which vibrates by the resonance in the approaching and separating direction with respect to the fixed portion of the first vibrator area, the second vibrator area includes a second vibrating position which vibrates by the resonance in the approaching and separating direction with respect to the fixed portion of the second vibrator area, and the coupling portion couples the first vibrating position and the second vibrating position.

In addition, it is allowed for the ultrasonic motor of the present invention to include a first connection portion extending from the first vibrating position toward the contact element; and a second connection portion extending from the second vibrating position toward the contact element, wherein the extending directions of the first connection portion and the second connection portion are intersected with each other.

In addition, it is allowed for the ultrasonic motor of the present invention to employ a configuration in which the first connection portion and the second connection portion are coupled by being intersected with each other, and the coupling portion is formed by being bent in a hook shape.

It should be noted that it is not necessary for the various kinds of constituent elements of the present invention to be individually independent existences and it is allowed to employ such a configuration in which a plurality of constituent elements are formed as one single member, one constituent element is formed by a plurality of members, a certain constituent element is a portion of another constituent element, a portion of a certain constituent element is overlapped with a portion of another constituent element, or the like.

Effect of the Invention

In the ultrasonic motor of the present invention, the positions, which largely vibrate when the first vibrator area and the second vibrator area resonate respectively in the surface-spreading directions, are coupled each other locally and thereby providing a contact element. Thus, a phenomenon in which the deformation of one resonating vibrator area is to be suppressed by the rigidity of the other resonating vibrator area is prevented and it is possible to obtain the displacement of the contact element adequately. Thus, it is possible to obtain an ultrasonic motor in which the amount of displacement of the driven movable element is large and the energy conversion efficiency is high.

BRIEF DESCRIPTION OF DRAWINGS

The objects mentioned above, other objects, features and advantages will become clearer by the preferable exemplified-embodiments described hereinafter and by the following drawings attached thereto.

FIGS. 5A and 5B are displacement-mode views of the piezoelectric element at the resonance frequency, in which FIG. 5A shows a state of maximum expandable deformation of the piezoelectric element and FIG. 5B shows a state of maximum contractible deformation of the piezoelectric element;

MODE FOR CARRYING OUT THE INVENTION

Figure 1:
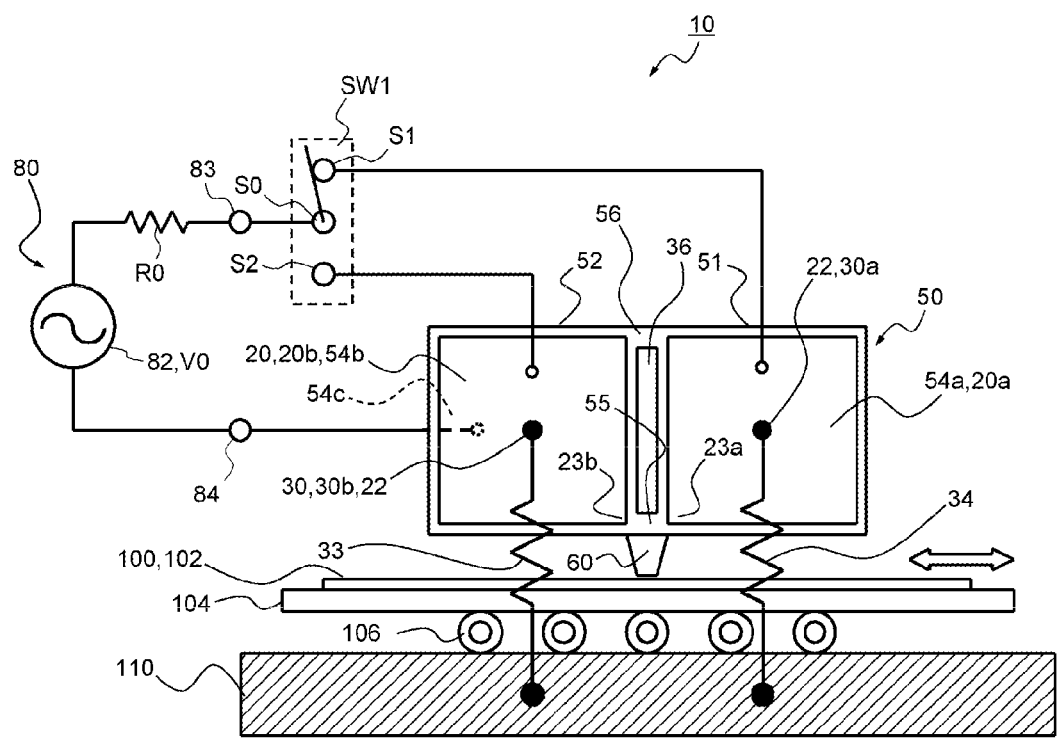
FIG. 1 is a schematic diagram showing a structure of an ultrasonic motor relating to a first exemplified embodiment.

Hereinafter, exemplified embodiments of the present invention will be explained based on the drawings. It should be noted in all the drawings that there are applied similar reference numerals to similar constituent elements and explanations thereof will be arbitrarily omitted.

<First Exemplified Embodiment>

Figure 2A:
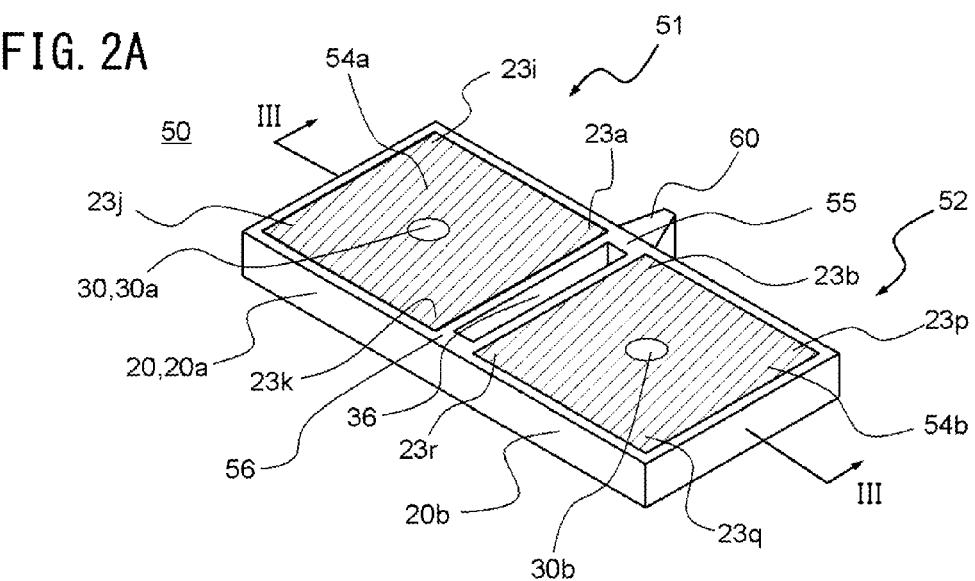
FIG. 2A is a perspective view of the vibrator seen from the driving electrode side.
Figure 2B:
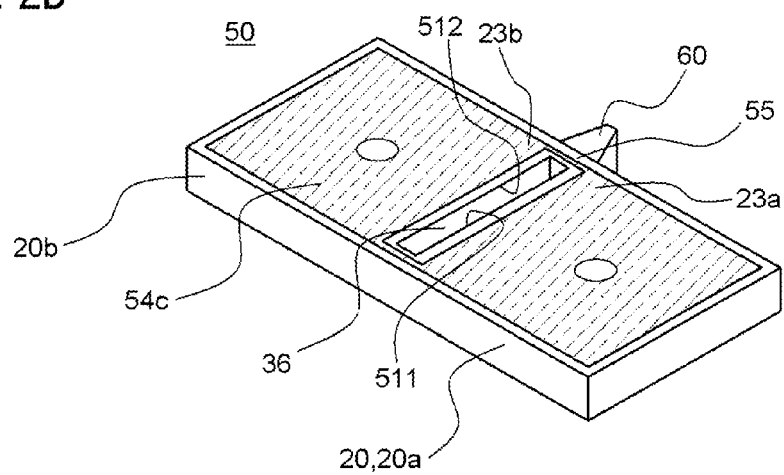
FIG. 2B is a perspective view of the vibrator seen from the common electrode side.

FIG. 1 is a schematic diagram showing a structure of an ultrasonic motor 10 relating to a first exemplified embodiment of the present invention. FIG. 2A and FIG. 2B are perspective views of the vibrator 50.

First, there will be explained an outline of the ultrasonic motor 10 of this exemplified embodiment.

The ultrasonic motor 10 of this exemplified embodiment is provided with a vibrator 50 and application means (oscillation circuit 80). The vibrator 50 includes a first vibrator area 51 and a second vibrator area 52.

The first vibrator area 51 includes a piezoelectric element 20a polarized toward the thickness direction and a fixed portion 30a. The second vibrator area 52 includes a piezoelectric element 20b polarized toward the thickness direction and a fixed portion 30b.

The oscillation circuit 80 is voltage application means which applies AC voltages to the piezoelectric elements 20a, 20b respectively and which makes the first vibrator area 51 and the second vibrator area 52 resonate individually toward the surface-spreading directions.

The first vibrator area 51 includes a first vibrating position (vibration end portion 23a) which vibrates, caused by the resonance of the surface-spreading direction, in the approaching and separating direction with respect to the fixed portion 30a. The second vibrator area 52 includes a second vibrating position (vibration end portion 23b) which vibrates, caused by the resonance of the surface-spreading direction, in the approaching and separating direction with respect to the fixed portion 30b.

The ultrasonic motor 10 of this exemplified embodiment is provided with a coupling portion 55 for coupling the first vibrating position (vibration end portion 23a) and the second vibrating position (vibration end portion 23b) and with a contact element 60 which is provided at that coupling portion 55.

Next, there will be explained this exemplified embodiment in detail.

The ultrasonic motor 10 drives a movable element 100 by means of the contact element 60 in a state of changing-over the direction toward the forward direction or toward the reverse direction (left side direction in FIG. 1). The moving direction of the movable element 100 in this exemplified embodiment is a linear direction and corresponds to the right & left direction indicated by an outline arrow in FIG. 1. In this exemplified embodiment, it is assumed that the right side direction in FIG. 1 is to be "forward direction" of the movable element 100 and the left side direction in FIG. 1 is to be "reverse direction". The movable element 100 of this exemplified embodiment is constituted by a configuration in which a biasing surface 102 receiving a driving force by being contacted with the contact element 60 is formed on the surface of a base plate 104. On the rear surface of the base plate 104, there are provided with rollers 106. In addition to this, for the movable element 100, it is allowed to employ an element in which a rotational roller is pivoted. In this case, the moving direction becomes the circumferential direction (rotational direction) of the rotational roller.

The vibrator 50 is an element which resonates in a predetermined natural vibration frequency by applying an AC voltage to the piezoelectric element 20. The vibrator 50 is composed of at least the first vibrator area 51 and the second vibrator area 52. The first vibrator area 51 and the second vibrator area 52 are coupled through the coupling portion 55.

The ultrasonic motor 10 is further provided with biasing means (elastic members 33, 34) for pressuring the contact element 60 onto the movable element 100. For the elastic member 33 shown in FIG. 1, the upper end thereof is connected with respect to the fixed portion 30a which is a concave hole provided at a surface-center portion 22 in the first vibrator area 51 and the lower end thereof is connected to an installation table 110. Similarly, for the elastic member 34, the upper end thereof is connected with respect to the fixed portion 30b which is a concave hole provided at a surface-center portion 22 in the second vibrator area 52 and the lower end thereof is connected to the installation table 110. The elastic members 33, 34 are stretched compared with the natural states thereof and always apply elastic forces with respect to the contact element 60 toward the direction of compressing it to the biasing surface 102.

The first vibrator area 51 forms approximately a square shape and is provided with a piezoelectric element 20a polarized in the thickness direction and with application electrodes which are provided approximately on the whole surfaces of the main surfaces of the front and rear surfaces thereof. At the surface-center portion 22 of the piezoelectric element 20a, there is provided a concave hole as the fixed portion 30a for fixing the first vibrator area 51 to the installation table 110. Similarly, also the second vibrator area 52 forms approximately a square shape and is provided with a piezoelectric element 20b polarized in the thickness direction and with application electrodes which are provided approximately on the whole surfaces of the main surfaces of the front and rear surfaces thereof. Also for the surface-center portion 22 of the piezoelectric element 20b, there is provide a concave hole as the fixed portion 30b.

As shown in FIG. 2, the vibrator 50 is provided with the piezoelectric element 20, with driving electrodes 54a, 54b which are formed approximately on the whole of the main surfaces of the front and rear surfaces thereof, and with a common electrode 54c.

The driving electrodes 54a, 54b are application electrodes which are provided individually on the individual surfaces of the first vibrator area 51 and the second vibrator area 52 and which are applied with the AC voltage selectively by the oscillation circuit 80. The common electrode 54c is an application electrode which is formed, on the other surface of the piezoelectric element 20, astride the first vibrator area 51 and the second vibrator area 52 and which is applied with the AC voltage simultaneously.

The first vibrator area 51 and the second vibrator area 52 form approximately square shapes having the same sizes, in which one sides thereof are mutually arranged by neighboring to each other. The areas having predetermined spaces including the four corner portions of the first vibrator area 51 respectively are made to be the vibration end portion 23a and corner portions 23i to 23k respectively. Similarly, the areas having predetermined spaces including the four corner portions of the second vibrator area 52 respectively are made to be the vibration end portion 23b and corner portions 23p to 23r respectively.

Between the first vibrator area 51 and the second vibrator area 52, there is provided a concave portion 36. The concave portion 36 is a low-rigidity portion for preventing one resonance of the first vibrator area 51 or the second vibrator area 52 from being transmitted to the other one thereof. It is allowed for the concave portion 36 to employ a slender-shaped through-slit or it is allowed to employ a non-penetrating bottomed groove. Also, it is allowed for the concave portion 36 to employ a configuration in which a plurality of concave holes are arranged. Within those configurations above, the concave portion 36 of this exemplified embodiment is a through-slit, and the first vibrator area 51 and the second vibrator area 52 are separated from each other. Then, the vibration end portion 23a, the corner portion 23k and the vibration end portion 23b, the corner portion 23r, which correspond to both sides sandwiching the slit shaped concave portion 36, are coupled by means of coupling portions 55, 56 respectively. The coupling portions 55, 56 of this exemplified embodiment are portions formed by expanding the parallel sides of the first vibrator area 51 and the second vibrator area 52, each of which has approximately a square shape, toward the alignment directions respectively and by coupling the areas each other.

In more detail, the first vibrator area 51 and the second vibrator area 52 of this exemplified embodiment form rectangular shapes neighboring to each other. The concave portion 36 is a slit shaped through-hole and is formed between mutually adjacent sides 511, 521 of the first vibrator area 51 and the second vibrator area 52. The concave portion 36 is extended along the sides 511, 521. The vibrator 50 of this exemplified embodiment is composed of an integral plate-shaped piezoelectric ceramic (piezoelectric body) which includes two rectangular-shaped areas constituting piezoelectric elements 20a, 20b; and slender-shaped areas constituting the coupling portions 55, 56. By providing the driving electrodes 54a, 54b and the common electrode 54c for such a piezoelectric body, there are formed the first vibrator area 51 and the second vibrator area 52.

Common resonance frequency is used for the piezoelectric element 20a and the piezoelectric element 20b. According to the ultrasonic motor 10 of this exemplified embodiment, the contact element 60 is driven by using a resonance mode in the surface-spreading directions of the piezoelectric elements 20a, 20b (see FIG. 6 for the displacement mode thereof). Here, the phenomenon in which the piezoelectric elements 20a, 20b resonate in the surface-spreading directions means that the displacement component in the main in-plane direction of each point constituting the piezoelectric elements 20a, 20b is adequately larger than the displacement component in the direction perpendicular to that plane.

On the one coupling portion 55, there is provided the contact element 60 which protrudes from the first vibrator area 51 and the second vibrator area 52. The contact element 60 is a pad composed of an abrasion-proof material such as zirconia, alumina or the like. It is allowed for the contact element 60 to be integrally formed by using the same material as the coupling portion 55 or it is allowed to constitute the contact element 60 by coupling a small piece composed of a different kind of material to the coupling portion 55. The coupling portions 55, 56 are belt-shaped bridging portions which locally couple the vertexes of the first vibrator area 51 and the second vibrator area 52 having approximately square shapes with each other, and which exerts no influence substantially to the resonances of the piezoelectric elements 20a, 20b.

As shown in FIG. 1, the oscillation circuit 80 includes an output voltage V0 outputted as an AC voltage of a sine wave, a triangular wave or the like for the driving voltage; and a switch SW1 for changing-over the electrodes to be applied with this driving voltage.

A common terminal S0 of the switch SW1 is always connected to one output terminal 83 of the oscillator 82. A terminal S1 is connected with the driving electrode 54a of the first vibrator area 51 and a terminal S2 is connected with the driving electrode 54b of the second vibrator area 52. The other output terminal 84 of the oscillator 82 is connected with the common electrode 54c of the first vibrator area 51 and the second vibrator area 52. In this manner, it is enough only to carry out the wiring for each of the electrode areas, so that it is not necessary to employ a complicated wiring process.

The driving voltage which the oscillator 82 outputs is an AC voltage having an internal resistance R0 and an output voltage V0, and specifically, it is a sinusoidal voltage. The frequency of such a sine wave is set to be the resonance frequency in the surface-spreading direction of the piezoelectric element 20a or 20b. More specifically, the ultrasonic motor 10 of this exemplified embodiment is based on a separate excitation system in which a sinusoidal voltage having an adjusted frequency is applied by the oscillator 82.

In this state, when the switch SW1 is thrown to the terminal S1 side, the AC voltage is applied to the driving electrode 54a and the common electrode 54c. On the other hand, when the switch SW1 is thrown to the terminal S2 side, the AC voltage is applied to the driving electrode 54b and the common electrode 54c.

Thus, in case of throwing the switch SW1 to the terminal S1, the first vibrator area 51 resonates and the second vibrator area 52 is opened. Conversely, in case of throwing the switch SW1 to the terminal S2, the second vibrator area 52 resonates and the first vibrator area 51 is opened. At that time, the vibrator areas of the resonance side and the opened side are substantially segmentalized by the concave portion 36, so that the distortion in the vibrator area on the resonance side remains in a state of driving only the contact element 60 by displacing the coupling portions 55, 56 and the distortion is not substantially transmitted to the vibrator area of the opened side.

Figure 3:
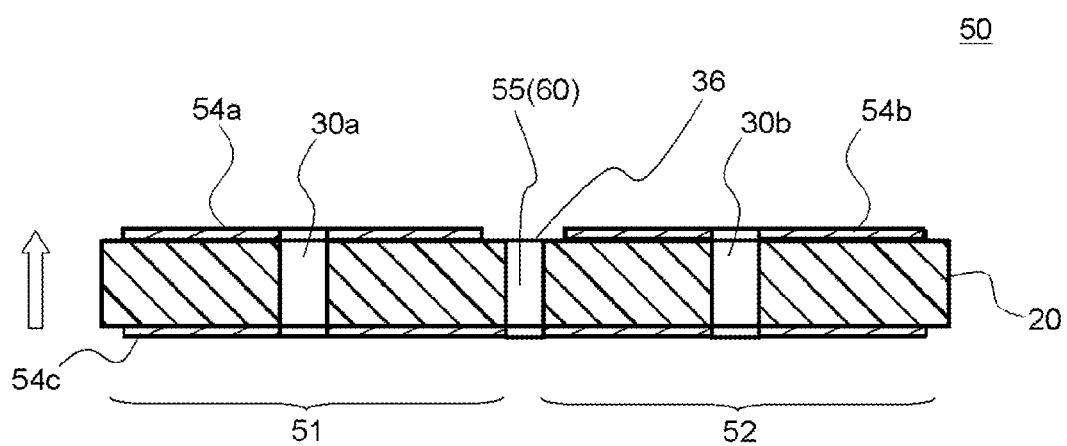
FIG. 3 is a cross-sectional diagram by a III-III line in FIG. 2A.

FIG. 3 is a cross-sectional diagram by a III-III line in FIG. 2A. In this exemplified embodiment, there are coated application electrodes on the common front and rear surfaces of the piezoelectric element 20 which lies over the first vibrator area 51 and the second vibrator area 52. More specifically, the piezoelectric element 20 and the coupling portion 55 are formed integrally by a piezoelectric material. Then, on one surface of the piezoelectric element 20, the driving electrodes 54a, 54b are laminated individually and on the other surface of the piezoelectric element 20, a common electrode 54c which lies over the first vibrator area 51 and the second vibrator area 52 is laminated.

As shown in FIG. 3, the piezoelectric element 20 is polarized in the thickness direction and naturally vibrates by a configuration in which an AC voltage having a resonance frequency of the piezoelectric element 20 is applied between one of the driving electrodes 54a, 54b and the common electrode 54c.

Figure 4:
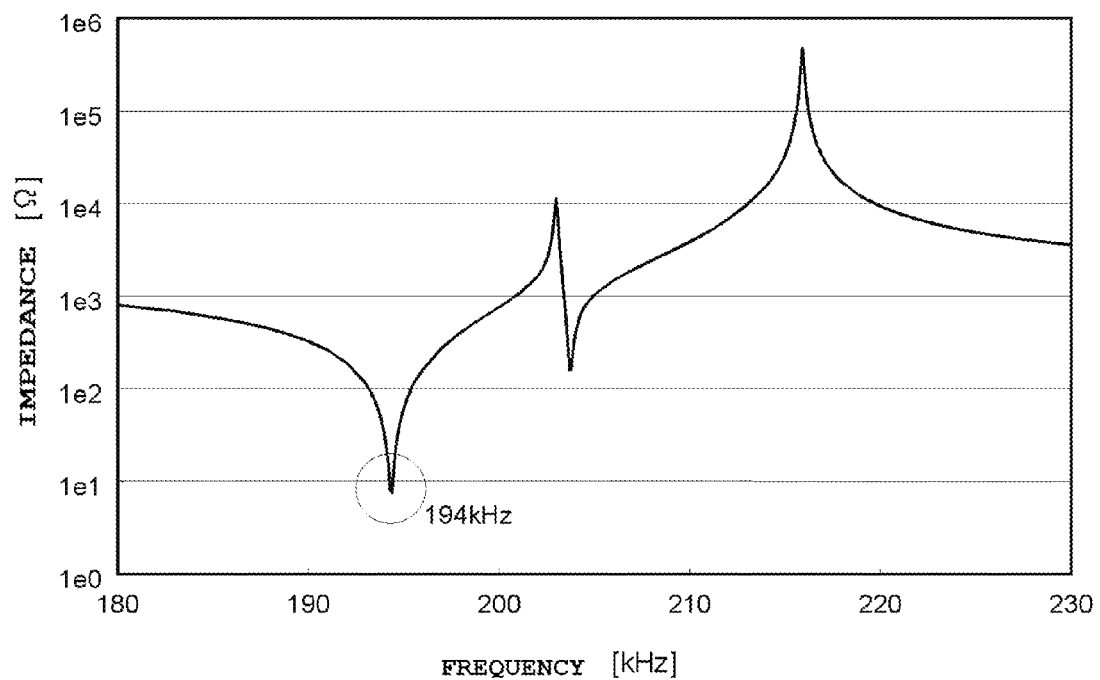
FIG. 4 is a diagram showing an example of a simulation result relating to the frequency characteristic of the impedance of the piezoelectric element.

FIG. 4 is a diagram showing an example of a simulation result relating to the frequency characteristic of the impedance of the piezoelectric element 20 in FIG. 1 and FIG. 2. For the simulation condition, with regard to the external dimensions of the piezoelectric element 20 composed of a piezoelectric ceramic, the width was made to be 22 mm, the height was made to be 10 mm and the thickness was made to be 2 mm, and the concave portion 36 was made to be a rectangular-shaped through-slit having a width of 2 mm and a height (length) of 9 mm. A 10 mm-square area was adopted for each of the first vibrator area 51 and the second vibrator area 52.

With respect to such a piezoelectric element 20, the impedance of the piezoelectric element 20 was simulated while changing the frequency of the sinusoidal voltage applied to the first vibrator area 51. At that time, the rigidities of the fixed portion 30, the contact element 60, the driving electrodes 54a, 54b and common electrode 54c are ignored.

Figure 5A:
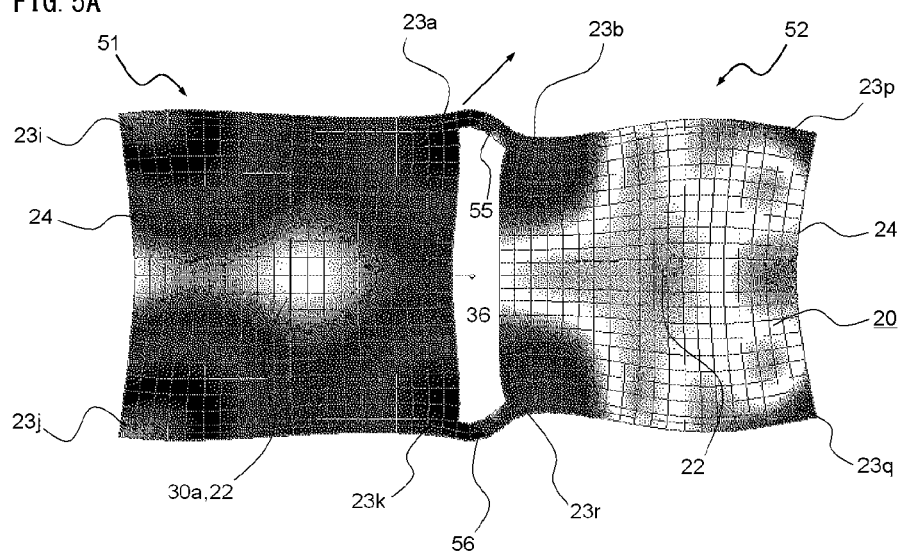
Figure 5B:
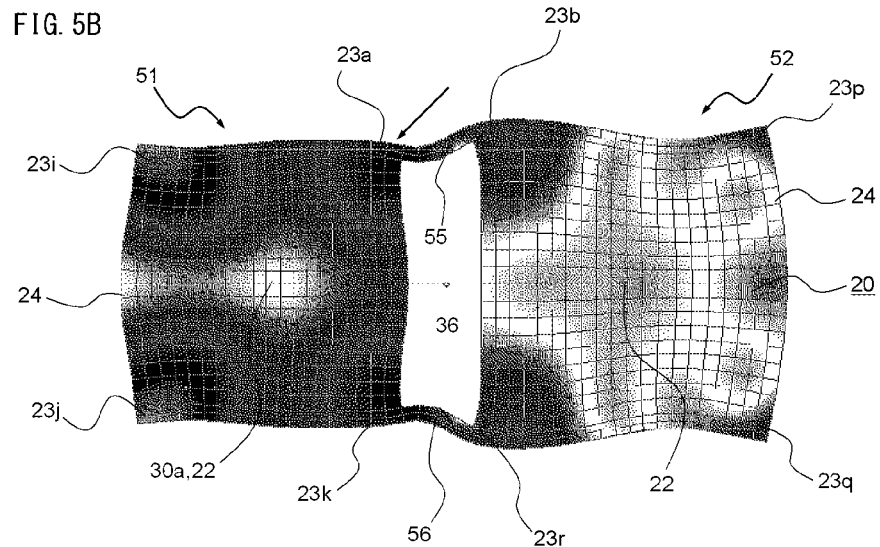

As shown in FIG. 4, there appeared a frequency in which the impedance becomes a minimum value at the frequency of 194 kHz. FIG. 5A and FIG. 5B are displacement-mode views obtained by applying the sinusoidal voltage of this resonance frequency to the first vibrator area 51 and by analyzing the piezoelectric element 20 according to a finite-element-method (FEM) in a state of opening the second vibrator area 52.

FIG. 5A shows a state of maximum expandable deformation of the piezoelectric element 20 and FIG. 5B shows a state of maximum contractible deformation thereof. It should be noted in the displacement-mode view that the position at which the amount of displacement is large is shown by a deep color and the position at which the amount of displacement is small is shown by a light color.

From FIG. 5, it is comprehended that the piezoelectric element 20 vibrates in the surface-spreading direction by this resonance frequency. Then, as shown in FIG. 5, the mode shapes of the first vibrator area 51 and the second vibrator area 52 caused by the resonance in the surface-spreading direction is characterized in that the surface-center portion 22 of the piezoelectric element 20 is made to be a fixed point and a peripheral portion 24 (vibration end portion 23a) is made to be a point of maximum displacement. In more detail, the first vibrator area 51 vibrates, as a whole, so as to expand and contract inside the plane surface, in which with regard to the vibration end portion 23a and the corner portions 23i to 23k, any one thereof repeats the approach or separation with respect to the fixed portion 30a. For the vibrator 50 of this exemplified embodiment, there are provided areas having small vibrational amplitudes at the respective surface-center portions 22 in the approximately square shaped areas, so that stable support & fixation will become easy. On the other hand, with regard to the ultrasonic motor in the abovementioned H7-184382, the area having a small vibrational displacement exists only approximately at a center of gravity position of the piezoelectric element and it is difficult to carry out the stable support & fixation. It should be noted in this exemplified embodiment that in case of saying "resonance" hereinafter without notification, it is assumed that the "resonance" means "resonance mode" in the surface-spreading direction.

The vibration end portion 23a lies at the peripheral portion 24 of the first vibrator area 51 and also, is a position at which the amount of displacement when the first vibrator area 51 resonates in the surface-spreading direction becomes maximum. Similarly, the vibration end portion 23b lies at the peripheral portion 24 of the second vibrator area 52 and also, is a position at which the amount of displacement when the second vibrator area 52 resonates in the surface-spreading direction becomes maximum. In other words, the vibration end portions 23a, 23b are positions at which the displacement components in the approaching and separating directions when the first vibrator area 51 and the second vibrator area 52 resonate individually become maximum respectively.

With regard to the second vibrator area 52, displacements of the vibration end portion 23a and the corner portion 23k inflow and the vibration end portion 23b and the corner portion 23r are displaced, but the other corner portions 23p, 23q of the second vibrator area 52 are hardly displaced. Thus, it is comprehended that the peripheral portion 24 of the first vibrator area 51 within the piezoelectric elements 20 resonates mainly and, in addition, that there does not occur resonance substantially in the second vibrator area 52.

As shown by arrows in FIG. 5A and FIG. 5B, for the piezoelectric elements 20 of this exemplified embodiment, the vibration end portion 23a resonates in a direction of repeating the approaching and separating (approaching and separating direction) with respect to the fixed portion 30a. In other words, the vibration end portion 23a resonates in a direction which intersects, by 45 degrees, with respect to the alignment direction of the first vibrator area 51 and the second vibrator area 52 (right & left direction in the drawing).

Thus, for the contact element 60 (see FIG. 1) formed at the coupling portion 55, there occurs a driving force intermittently toward the upper right direction in FIG. 5, which is caused by the resonance of the first vibrator area 51.

It should be noted that in case of applying the sinusoidal voltage to the driving electrode 54b of the second vibrator area 52, the displacement-mode diagrams of the piezoelectric element 20 become diagrams obtained by reversing the right and left directions in the respective drawings of FIG. 5. Therefore, in this case, for the contact element 60 formed at the coupling portion 55, there occurs a driving force intermittently toward the upper left direction in FIG. 5, which is caused by the resonance of the second vibrator area 52.

Figure 6A:
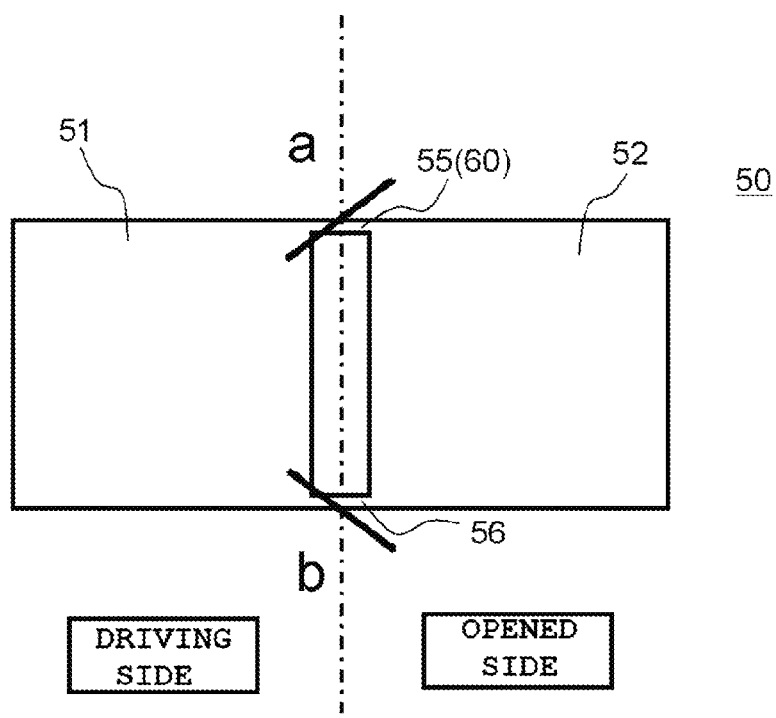
FIG. 6A is a schematic diagram showing a displacement direction of a contact element in a case in which the first vibrator area is made to be an application side (driving side) of the sinusoidal voltage and the second vibrator area is made to be a non-application side (opened side)
Figure 6B:
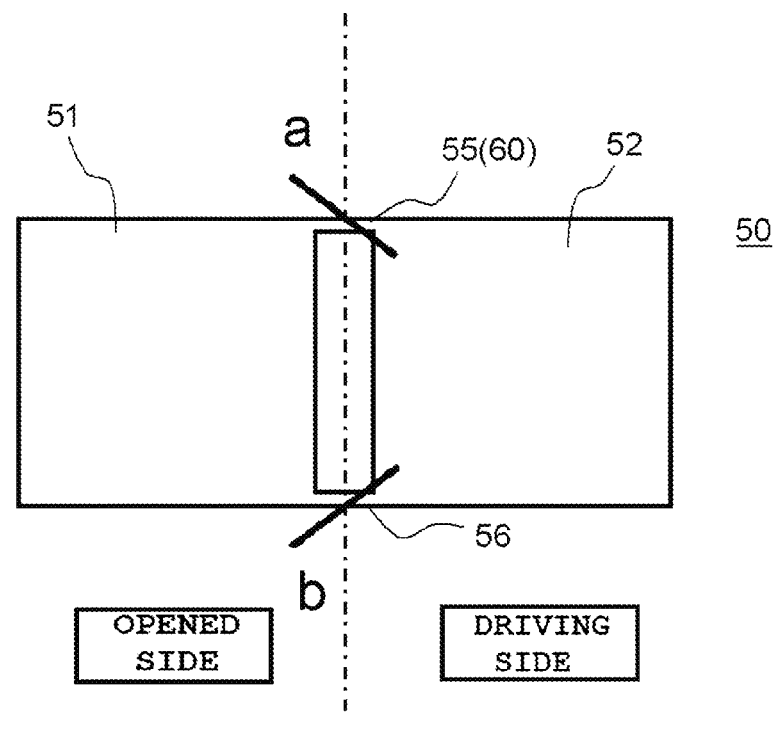
FIG. 6B is schematic diagram showing the displacement direction of the coupling portion in case of changing-over the driving side and the opened side.

FIG. 6A and FIG. 6B are schematic diagrams showing displacement directions of the coupling portions 55, 56 in case of changing-over the application side (driving side) and the non-application side (opened side) of the sinusoidal voltage. In each of the drawings, reciprocating movements of the loci of the contact element 60 of the first coupling portion 55, which is notified by "a" and of the contact element 60 of the second coupling portion 56, which is notified by "b" are indicated by bold lines. As shown in the drawings, the loci of the contact elements 60 for the respective ones of the first coupling portion 55 and the second coupling portion 56 intersect diagonally with respect to a boundary line separating the first vibrator area 51 and the second vibrator area 52 (shown by a dashed-dotted line in each of the drawings). Then, by changing-over the application side (driving side) and the non-application side (opened side) of the sinusoidal voltage, the locus of each the contact element 60 is reversed centered on the boundary line.

As shown in each drawing of FIG. 6, the displacement component of the surface-spreading direction of the contact element 60 is reversed for the right and left direction in the alignment direction of the first vibrator area 51 and the second vibrator area 52 by a configuration in which the application means (oscillation circuit 80) changes-over the application of the AC voltage between the first vibrator area 51 and the second vibrator area 52. Thus, it is possible for the ultrasonic motor 10 of this exemplified embodiment to reverse the driving direction of the movable element 100 for the positive and negative direction thereof by the changeover of the switch SW1 (see FIG. 1).

More specifically, the application means (oscillation circuit 80) of this exemplified embodiment applies the AC voltage selectively to the piezoelectric element 20a of the first vibrator area 51 or to the piezoelectric element 20b of the second vibrator area 52 and reciprocates the contact element 60. In the resonance mode in the surface-spreading direction of the piezoelectric element 20, the locus of the reciprocal vibration of the coupling portion 55, 56 forms a straight-line shape. During a period in which the oscillation circuit 80 of this exemplified embodiment applies the AC voltage of one cycle or more to one of the piezoelectric elements (for example, piezoelectric element 20a), the other piezoelectric element (for example, piezoelectric element 20b) is not applied with the voltage substantially. Then, during a period in which the other piezoelectric element (for example, piezoelectric element 20b) is applied with the AC voltage of one cycle or more after the switch SW1 is changed-over, the one of the piezoelectric elements (for example, piezoelectric element 20a) is not applied with the voltage substantially.

In this manner, the application means (oscillation circuit 80) of this exemplified embodiment changes the locus of the reciprocating movement of the contact element 60 by changing-over the selection of the piezoelectric elements 20a, 20b to be applied with the AC voltage.

Here, the ultrasonic motor of the abovementioned H7-184382 is a motor which is driven by using bending-vibration having a low electromechanical coupling coefficient, so that it is necessary to heighten the driving voltage in order to obtain a high output. On the other hand, in the ultrasonic motor 10 of this exemplified embodiment, the contact element 60 is driven by using the resonance mode in the surface-spreading direction of the vibrator 50, so that the coupling coefficient is large compared with that of the bending-vibration of the vibrator 50 and it is possible to achieve a drive by a low voltage.

Also, the ultrasonic motor of the abovementioned H7-184382, is a motor in which a standing wave and a longitudinal wave are induced simultaneously by supplying electricity to the diagonal two electrodes of a rectangular piezoelectric element and a contact element is made to move elliptically by superimposing these two waves. Here, the standing wave and the longitudinal wave have different frequencies, so that the characteristics thereof with respect to the temperature and the mechanical load are different from each other. Therefore, in the ultrasonic motor of H7-184382 which is driven by superimposing the standing wave and the longitudinal wave, there occurs a phenomenon in which the operation frequency will change caused by the ambient temperature and the mechanical load, and the operation thereof becomes unstable. On the other hand, it is unnecessary for the ultrasonic motor 10 of this exemplified embodiment to employ an adjustment with respect to the change in the temperature or in the mechanical load by using a single vibration mode and it is possible to obtain a stable operation.

Also, such as shown in the vibrator 50 of this exemplified embodiment, it is possible to apply a driving force preferably to the movable element 100 without the idling of the contact element 60 by coupling the first vibrator area 51 and the second vibrator area 52 beforehand and also by biasing this vibrator on a steady basis with respect to the movable element 100. More specifically, supposing that the first vibrator area 51 and the second vibrator area 52 are constituted separately and also in a case in which the biasing is applied on a steady basis by depressing the movable element 100 individually, there is a fear, in case of driving one area thereof (for example, first vibrator area 51), that the biasing force of the other area thereof (second vibrator area 52) becomes a resistance force. On the other hand, in case of making the other area thereof (second vibrator area 52) non-contact with the movable element 100 at the time of the drive by the one area thereof (first vibrator area 51), it is not possible to bias the depressing force onto the movable element 100 on a steady basis, so that it becomes a situation in which the contact element 60 of the first vibrator area 51 repeats contact and separation with respect to the movable element 100 within the resonant cycle. In this case, there is a fear that the contact element 60 will become worn easily, the idling of the contact element 60 will occur and so on. Consequently, such as shown in this exemplified embodiment, by employing a configuration in which the contact element 60 is commonalized by coupling the first vibrator area 51 and the second vibrator area 52, and this contact element is driven by being biased on a steady basis with respect to the movable element 100, it is possible to drive the movable element 100 continuously without the occurrence of the resistance force. Also, the contact element 60 keeps on contacting with the movable element 100, so that wearing of the contact element 60 is suppressed without a phenomenon in which the contact element is frictioned impulsively with respect to the movable element 100.

<Second Exemplified Embodiment>

Figure 7A:
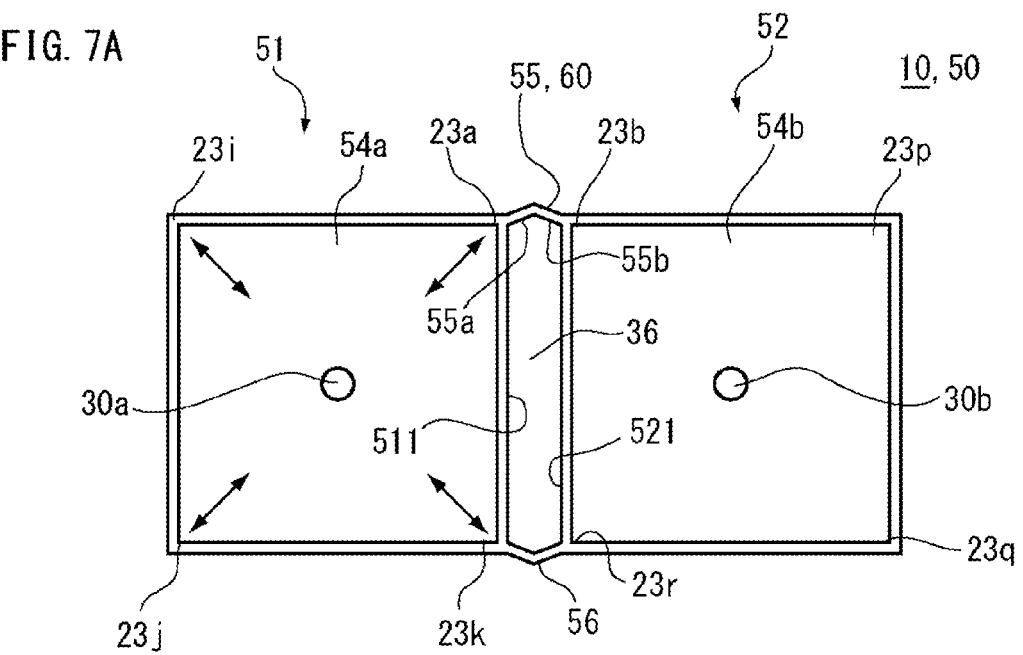
FIG. 7A is a schematic plane view showing an ultrasonic motor relating to a second exemplified embodiment.
Figure 7B:
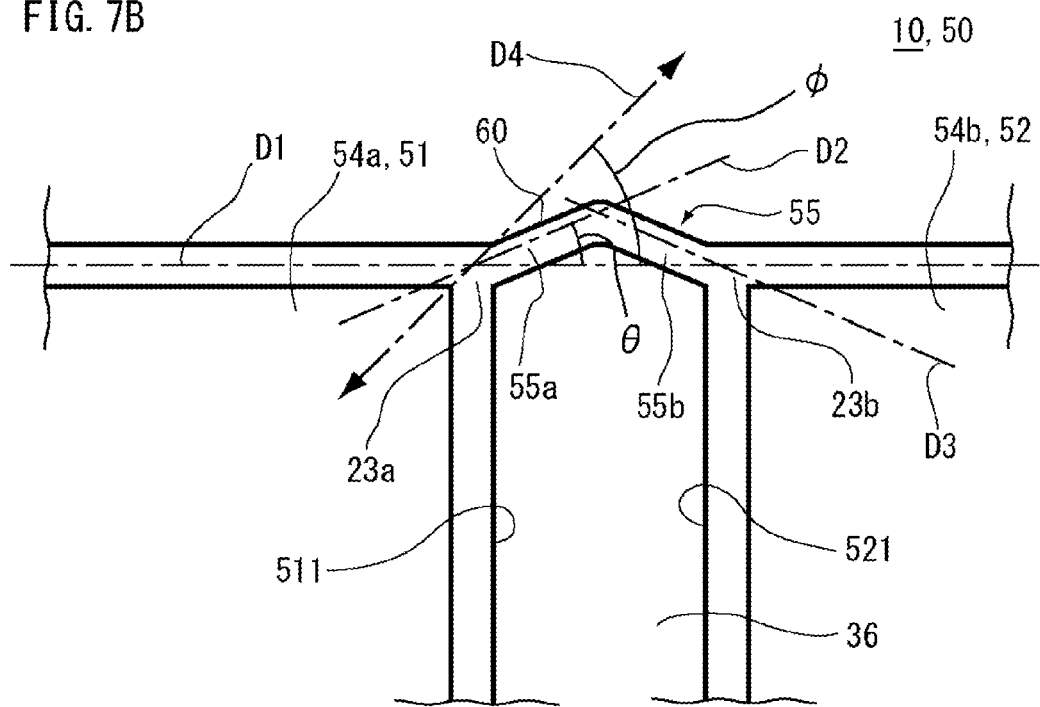
FIG. 7B is a partially enlarged view relating to the vicinity of the coupling portion.

FIG. 7A is a schematic plane view showing an ultrasonic motor 10 (vibrator 50) relating to this exemplified embodiment. FIG. 7B is a partially enlarged view relating to the vicinity of the coupling portion 55.

As shown in FIG. 7A and FIG. 7B, at the coupling portion 55, the first connection portion 55a and the second connection portion 55b are coupled by being intersected with each other, and the coupling portion 55 is formed by being bent in a hook shape. Here, the configuration in which the first connection portion 55a and the second connection portion 55b is coupled with each other includes a case in which the first connection portion 55a and the second connection portion 55b are connected indirectly by a configuration in which another member intervenes therebetween other than a case in which the first connection portion 55a and the second connection portion 55b are integrally formed by a common material such as shown in this exemplified embodiment.

For the contact element 60, a material harder than that of the first connection portion 55a and the second connection portion 55b is constituted by being film-formed at least on the surface of the outside of the coupling portion 55 (on the upper edge of the coupling portion 55 in FIG. 7B).

In the ultrasonic motor 10 of this exemplified embodiment, the coupling portion 55 includes the first connection portion 55a and the second connection portion 55b. The first connection portion 55a is a portion extending from the first vibrating position (vibration end portion 23a), which vibrates in the approaching and separating direction with respect to the fixed portion 30a when resonating in the surface-spreading direction of the piezoelectric element 20, toward the contact element 60. The second connection portion 55b is, likewise, a portion extending from the second vibrating position (vibration end portion 23b), which vibrates in the approaching and separating direction with respect to the fixed portion 30b, toward the contact element 60. Then, the extending directions D2, D3 of the first connection portion 55a and the second connection portion 55b intersect with each other.

The first connection portion 55a extends toward the opposite side with respect to the fixed portion 30a (toward the upper right side in FIG. 7A) by making the vibration end portion 23a as the proximal end and the distal end thereof functions as the contact element 60. Also, the second connection portion 55b extends toward the opposite side with respect to the fixed portion 30b (toward the upper left side in FIG. 7A) by making the vibration end portion 23b as the proximal end and likewise, the distal end thereof functions as the contact element 60. Then, the first connection portion 55a and the second connection portion 55b are coupled to each other by a predetermined intersection angle which is over 90 degrees and less than 180 degrees.

It should be noted that the other coupling portion 56 which connects the corner portion 23k and the corner portion 23r has a shape formed by reversing the up and down sides of the coupling portion 55. Specifically, a portion extending toward the opposite side of the fixed portion 30a by making the corner portion 23k as the proximal end and a portion extending toward the opposite side of the fixed portion 30b by making the corner portion 23r as the proximal end are coupled in a bent configuration.

Thus, the concave portion 36 defined by the sides 511, 521 neighboring to the first vibrator area 51 and the second vibrator area 52 and by the coupling portions 55, 56 forms a long hexagonal shape.

As shown in FIG. 7B, the extending direction D2 of the first connection portion 55a has a shallower angle than the angle of the approaching and separating direction D4 by making the alignment direction of the first vibrator area 51 and the second vibrator area 52 as a reference direction (reference direction D1: right & left direction in the drawing). In other words, compared with the angle φ by which the vibration end portions 23a, 23b resonate with respect to the reference direction D1, the angle θ by which the first connection portion 55a extends with respect to this reference direction D1 is small.

Specifically, the angle θ by which the first connection portion 55a extends is 30 degrees and the angle φ by which the vibration end portion 23a resonates is 45 degrees. It should be noted that the angle formed by the approaching and separating direction D4 of the vibration end portion 23b and the reference direction D1 is also 30 degrees.

Figure 8:
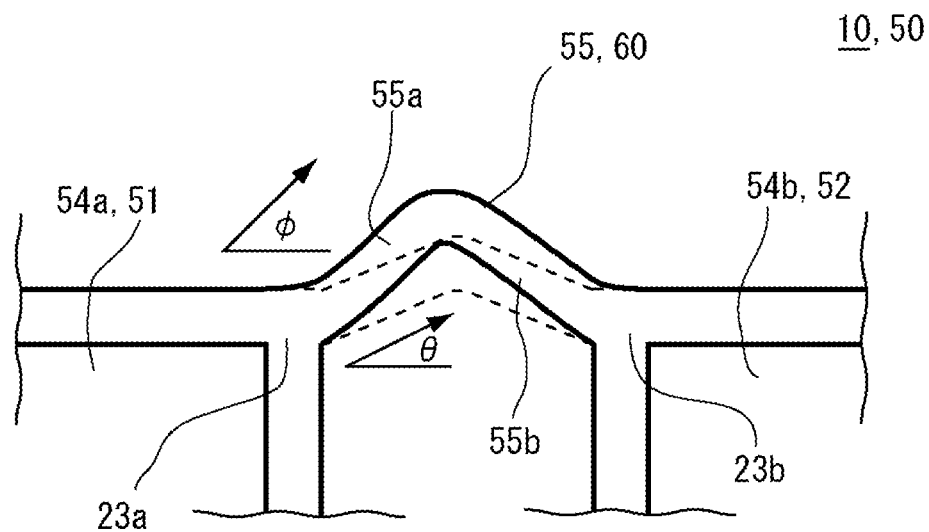
FIG. 8 is a schematic diagram showing the shape of the coupling portion when resonating.

FIG. 8 is a schematic diagram showing a shape of the coupling portion 55 when resonating. The shape of the coupling portion 55 before the resonance is indicated by broken lines. In the same drawing, the displacement of the vibration end portion 23a by the resonance is omitted and only the deformation of the coupling portion 55 is shown. When a sinusoidal voltage is applied to the driving electrode 54a and the first vibrator area 51 resonates in the surface-spreading direction, the vibration end portion 23a is displaced in the diagonal line direction (direction of angle φ) of the driving electrode 54a. Here, the first connection portion 55a before the displacement extends by the angle θ smaller than the angle φ from the vibration end portion 23a and the second connection portion 55b is coupled to the distal end thereof.

Here, either one of the first connection portion 55a and the second connection portion 55b forms a slender shape in which the extended size is larger than the width size. For this reason, the rigidity in the extending directions of the first connection portion 55a and the second connection portion 55b is higher than the rigidity in the direction intersecting with that extending direction (width direction). Therefore, when the vibration end portion 23a is displaced in the approaching and separating direction with respect to fixed portion 30a (direction of angle φ) on an occasion when the first vibrator area 51 resonates, the first connection portion 55a follows the vibration end portion 23a and is displaced in the extending direction thereof. On the other hand, the second connection portion 55b whose proximal end is coupled and fixed to the vibration end portion 23b is bent by being biased in the width direction by the first connection portion 55a. Consequently, the first connection portion 55a and the second connection portion 55b are deformed such as a link mechanism and the extending angle θ becomes large. As the result thereof, in the phase in which the vibration end portion 23a is displaced maximally on an occasion of the resonance, the extending direction of the first connection portion 55a coincides approximately with a vibrating direction (angle φ) of the vibration end portion 23a. Thus, with regard to the contact element 60 which corresponds to the intersecting portion between the first connection portion 55a and the second connection portion 55b, it is possible to obtain a large driving force.

In other words, with regard to the mode shape of the vibrator 50 of this exemplified embodiment, the extending direction of the first connection portion 55a (second connection portion 55b) coincides approximately with the displacement direction of the vibration end portion 23a (vibration end portion 23b) in the phase in which the contact element 60 applies maximal biasing force with respect to the movable element 100 (see FIG. 1).

There is no limitation in particular for the shapes of the first vibrator area 51 and the second vibrator area 52 so long as there occur resonances in the surface-spreading directions by common natural vibration frequencies. As an example, it is possible for the shapes of the first vibrator area 51 and the second vibrator area 52 to cite rectangular shapes, square shapes or circular shapes which are approximately identical to each other.

Figure 9A:
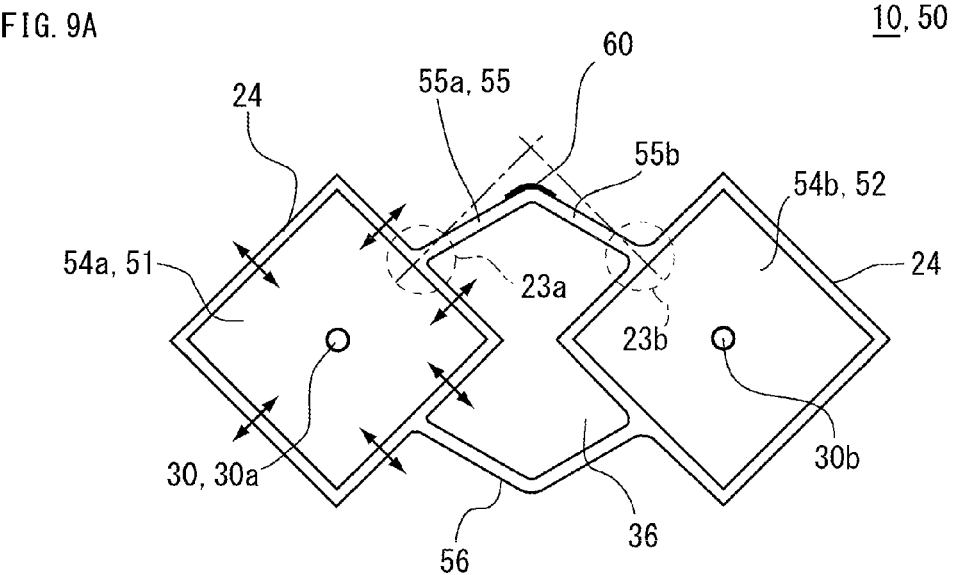
FIG. 9A is a schematic diagram of the vibrator relating to a first modification example.
Figure 9B:
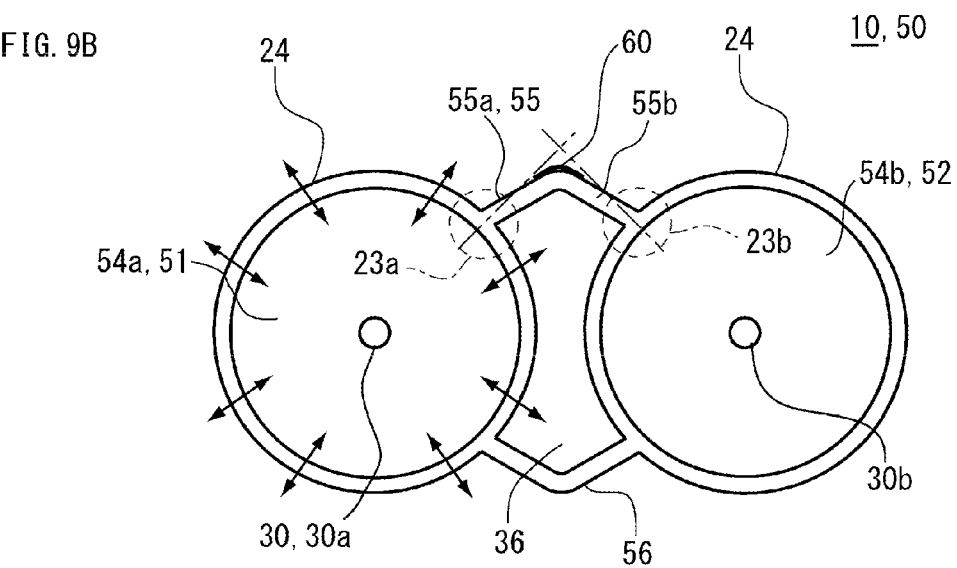
FIG. 9B is a schematic diagram of the vibrator relating to a second modification example.

FIG. 9A is a schematic diagram of a vibrator 50 relating to a first modification example in which the first vibrator area 51 and the second vibrator area 52 have approximately identical square shapes and also, in which the diagonal lines thereof are mutually arranged linearly. FIG. 9B is a schematic diagram of a vibrator 50 relating to a second modification example in which the first vibrator area 51 and the second vibrator area 52 have approximately identical circular shapes. In each drawing, the resonance directions in case of fixing the fixed portion 30a and applying the sinusoidal voltage to the driving electrode 54a are indicated by bidirectional arrows.

For the vibrator 50 of the first modification example shown in FIG. 9A, there is formed a coupling portion 55 by setting mutual center portions of the one sides within the peripheral portions 24 of the first vibrator area 51 and the second vibrator area 52, both of which have approximately square shapes, to be proximal ends. Then, there is formed a coupling portion 56 in such a way that there are coupled another set of sides which are neighboring to the sides from which the coupling portion 55 is extended and concurrently, which are faced to each other on the first vibrator area 51 and the second vibrator area 52. The coupling portion 55 is constituted by a first connection portion 55a extending from the first vibrator area 51 and a second connection portion 55b extending from the second vibrator area 52, and at the bent portion of the coupling portion 55 formed by a configuration in which the first connection portion 55a and the second connection portion 55b are coupled by being intersected, there is formed a contact element 60. In this manner, it is allowed for the coupling portions 55, 56 to be formed by making the corner portions thereof as the proximal ends such as shown in the first and second exemplified embodiments or it is allowed such as shown in this modification example to be formed by making the side centers thereof as the proximal ends.

Also, in such a case as the vibrator 50 of the second modification example shown in FIG. 9B in which the first vibrator area 51 and the second vibrator area 52 have circular shapes, it is possible to constitute the coupling portion 55 by coupling the first connection portion 55a and the second connection portion 55b, each of which is formed by being protruded toward the outside in the diameter direction from an arbitrary position of the peripheral portion 24.

By forming the first vibrator area 51 and the second vibrator area 52 in circular shapes respectively such as the shapes in this modification example, the isotropic surface-spreading vibrations occur in the respective vibrators, so that it is possible to drive the contact element 60 preferably even in a case in which the first connection portion 55a and the second connection portion 55b are extended from arbitrary positions of the peripheral portions 24.

It should be noted also in these modification examples that by making the alignment direction (right & left direction in the drawing) of the first vibrator area 51 and the second vibrator area 52 as a reference direction, each of the extending directions of the first connection portion 55a and the second connection portion 55b has a shallower angle than the angle of each of the approaching and separating directions D4 (illustrated by dashed-dotted lines in FIG. 9) of the vibration end portions 23a, 23b (illustrated by broken-line circles in FIG. 9) when resonating. Then, between the first vibrator area 51 and second vibrator area 52, there is formed a concave portion 36 as a through-hole extending in an intersecting direction (up & down direction in the drawing) with respect to the alignment direction of the first vibrator area 51 and the second vibrator area 52.

Also, instead of the first and second modification examples, it is allowed to couple the first vibrator area 51 and the second vibrator area 52 only by one place of the coupling portion 55. In this manner, it is allowed for the first vibrator area 51 and the second vibrator area 52 to be coupled by a single place or to be coupled by a plurality of places as explained in the abovementioned exemplified embodiments and the modification examples. By being coupled by a single place, the coupling between the first vibrator area 51 and the second vibrator area 52 is weakened and it is possible to obtain a large displacement of the coupling portion 55. Also, by being coupled by a plurality of places, it is possible to obtain symmetry of the displacement modes in which the fixed portions 30a, 30b are made to be centers thereof and a stable drive of the contact element 60 becomes possible.

<Third Exemplified Embodiment>

Figure 10:
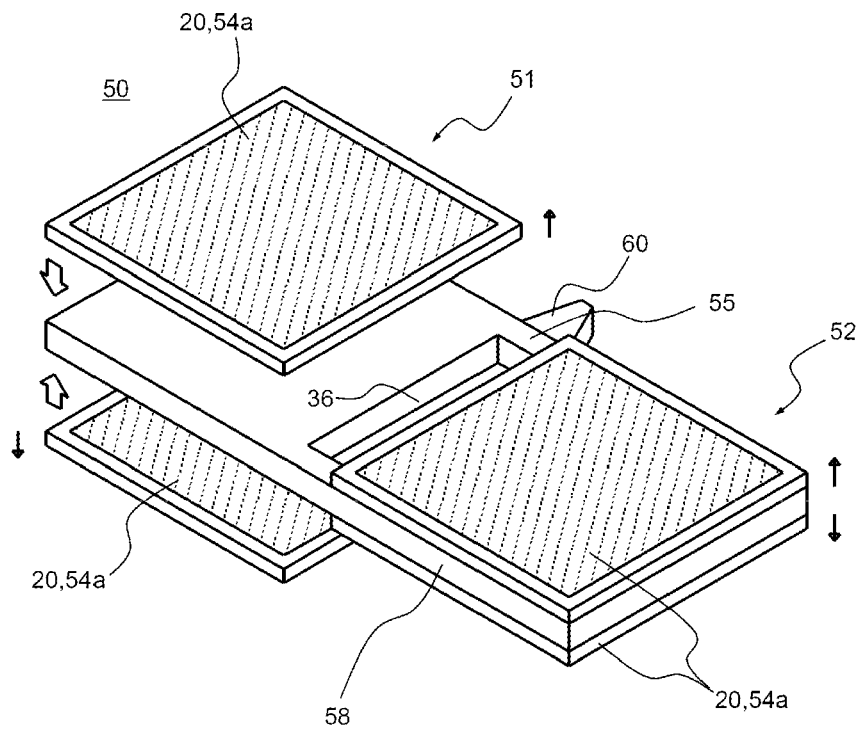
FIG. 10 is an exploded perspective view of the vibrator relating to a third exemplified embodiment.

FIG. 10 is an exploded perspective view of the vibrator 50 of this exemplified embodiment.

The vibrator 50 of this exemplified embodiment is provided with the first vibrator area 51, the second vibrator area 52 and a metal-made base member 58 lying over the coupling portion 55. The first vibrator area 51 and the second vibrator area 52 are constituted by a configuration in which the piezoelectric elements 20 formed with the driving electrodes 54a which are the application electrodes of the AC voltage are joined to the base member 58 respectively.

The vibrator 50 of this exemplified embodiment is a bimorph type piezoelectric vibrator in which two sheets of the piezoelectric elements 20 for each one and total four sheets thereof are attached onto the front and back sides of the base member 58. It should be noted that as a modification example of this exemplified embodiment, it is allowed to provide the piezoelectric elements 20 only on the one surface side of the base member 58. More specifically, as indicated by outline arrows in FIG. 10, the piezoelectric elements 20 composed of piezoelectric ceramic materials are pasted on the approximately square-shaped areas of at least one of the main surfaces of the base member 58 composed of a metal plate.

The driving electrode 54a which is pasted on the surface side of the base member 58 is connected to the base member 58 electrically. As shown by arrows in FIG. 10, polarization directions of the pair of piezoelectric elements 20 which are faced to each other by sandwiching the base member 58 are arranged so as to have directions opposite to each other.

For the base member 58, there is formed a through-slit (concave portion 36) at the center portion in the length direction which corresponds to the alignment direction of the first vibrator area 51 and the second vibrator area 52. Thus, the base member 58 is area-divided approximately symmetrically with regard to the length direction. The first vibrator area 51 and the second vibrator area 52 are coupled locally by the coupling portions 55, 56. For the main surfaces of the base member 58, it is allowed to provide bottomed concave portions (not shown) for mounting the piezoelectric elements 20 by fitting configurations.

Figure 11A:
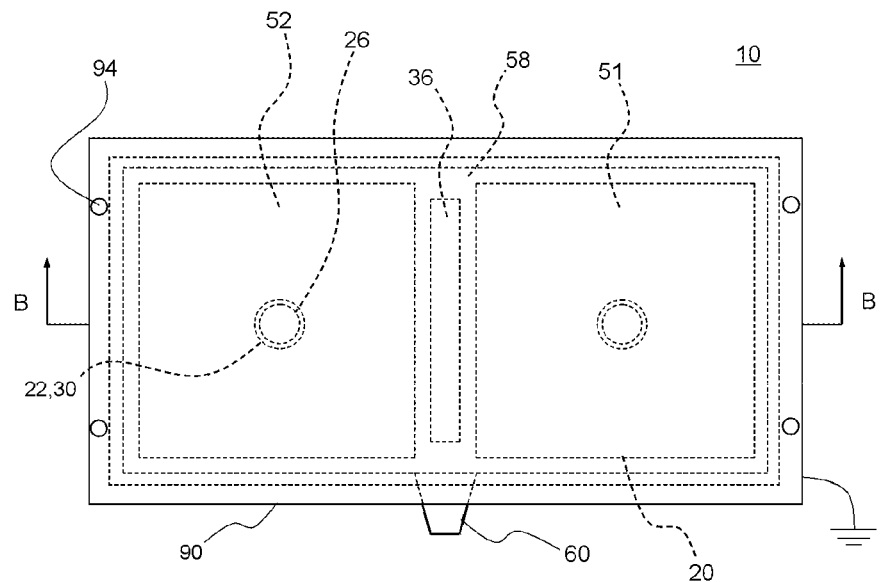
FIG. 11A is a plan view of an ultrasonic motor including a vibrator.
Figure 11B:
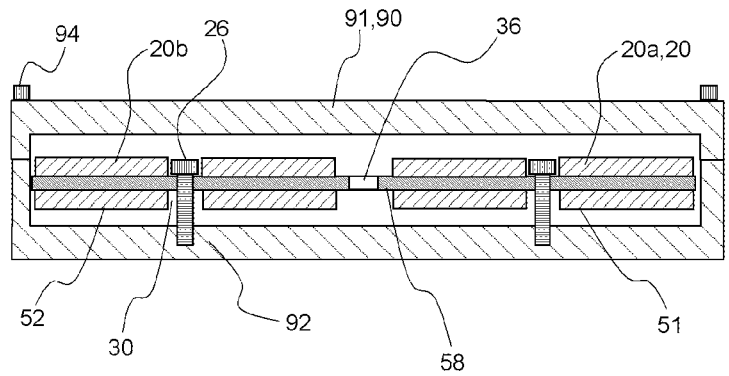
FIG. 11B is a cross-sectional diagram by a B-B line in FIG. 11A.

FIG. 11A is a plan view of an ultrasonic motor 10 including a vibrator 50 of this exemplified embodiment and FIG. 11B is a cross-sectional diagram by a B-B line thereof.

The ultrasonic motor 10 of this exemplified embodiment is provided with a housing 90 for housing the first vibrator area 51 and the second vibrator area 52 by exposing at least a portion of the contact element 60 to the outside. The fixed portions 30a, 30b are positions for fixing the fixed points (surface-center portions 22) of the first vibrator area 51 and the second vibrator area 52 to the housing 90.

The housing 90 is composed of an upper-side housing 91 and a lower-side housing 92. The upper-side housing 91 and the lower-side housing 92 are fixed detachably by screws 94. There is formed a housing space in the inside of the vibrator 50 by combining the upper-side housing 91 and the lower-side housing 92.

For the respective piezoelectric elements 20 and the base member 58, there are formed the fixed portions 30 as through-holes. The base member 58 is fixed to the lower-side housing 92 by the screws 26 which are inserted into the fixed portions 30.

The distal end of the contact element 60 within the vibrator 50 protrudes from the housing 90. The housing 90 is arranged adjacent to the movable element 100 and by coupling the housing 90 by the elastic members 33, 34 with respect to the installation table 110, the contact element 60 is biased toward the movable element 100 (see FIG. 1). It should be noted that the housing 90 is grounded to the earth.

Then, by the oscillation circuit 80 (not shown in FIG. 11, see FIG. 1), the sinusoidal voltage is applied between a pair of piezoelectric elements 20a which are included in one vibrator (for example, first vibrator area 51) and a pair of piezoelectric elements 20b of the other vibrator (for example, second vibrator area 52) are made to have open-circuit potential. Specifically, the sinusoidal voltages having the same phase are applied simultaneously with respect to the outer surfaces of the pair of piezoelectric elements 20a sandwiching the base member 58. Then, the base member 58 is made to be a common electrode.

Thus, the resonance of the surface-spreading direction occurs in the first vibrator area 51. Then, in the contact element 60 provided at the center of the long side portion of the base member 58, there occurs a vibration which draws a locus in the direction of an oblique straight-line with respect to that long side direction. By the mechanism in which the contact element 60 contacts the movable element 100 (see FIG. 1) which is installed linearly or freely rotatably or the like, it is possible to move this movable element.

Then, by changing-over the electrical-supply state of the sinusoidal voltage and the opened state between the first vibrator area 51 and the second vibrator area 52, it becomes possible to carry out the change-over of the moving directions of the movable element 100 for the forward and reverse directions.

The lower-side housing 92 of this exemplified embodiment is a metal-made housing and is connected to the base member 58 electrically through the screws 26. Also, the screws 26 are insulated from the driving electrodes 54a of the piezoelectric element 20. In addition to this, it is allowed to employ a configuration in which the lower-side housing 92 is made by an insulating non-metal material and the base member 58 is grounded to the earth.

In the ultrasonic motor 10 of this exemplified embodiment, it is possible by using the metal-made base member 58 to eliminate the driving electrode 54a which is on the surface joined with the base member 58 and which is included within the piezoelectric element 20. In other words, it is possible to use the base member 58 as the common electrode of the piezoelectric element 20 and concurrently, to provide the output terminal 84 (see FIG. 1) on the outside of the lower-side housing 92 (housing 90) which is connected electrically to that base member.

<Fourth Exemplified Embodiment>

Figure 12:
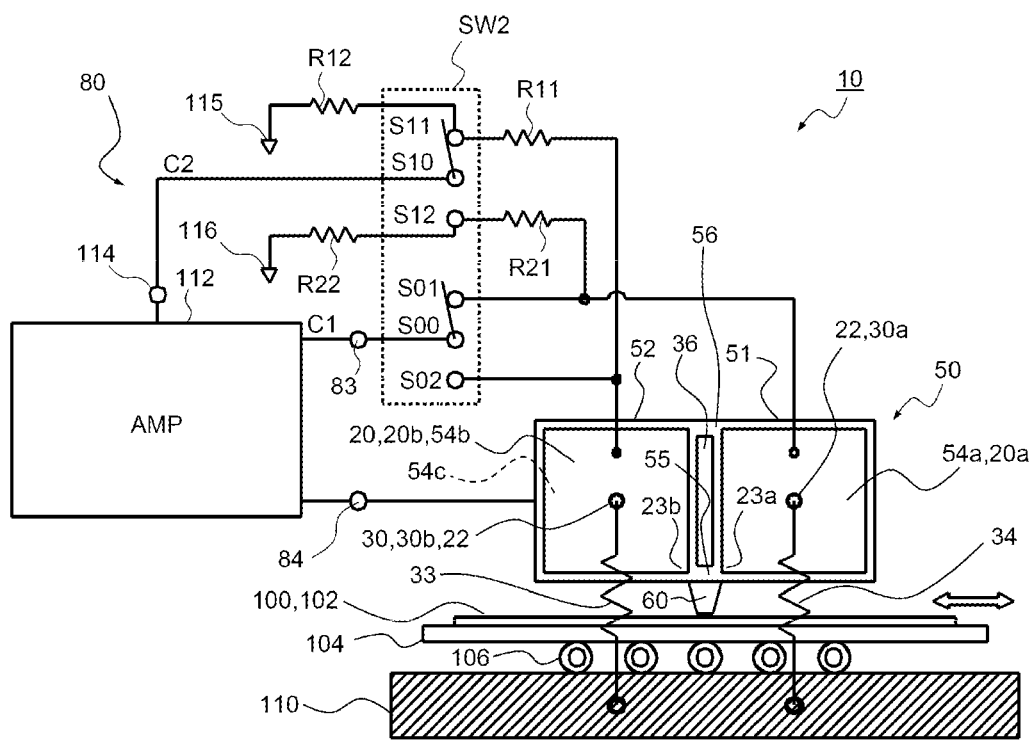
FIG. 12 is a schematic diagram showing a structure of an ultrasonic motor relating to a fourth exemplified embodiment.

FIG. 12 is a schematic diagram showing a structure of an ultrasonic motor 10 of this exemplified embodiment. The ultrasonic motor 10 of this exemplified embodiment is a motor which drives the movable element 100 by using the vibrator 50 similarly as that of the first exemplified embodiment, characterized in that the oscillation circuit 80 is constituted by a self-excited oscillation circuit including a feedback oscillator (amplifier) 112, a first circuit C1 and a second circuit C2. The vibrator 50, the elastic members 33, 34, the movable element 100, the base plate 104, the roller 106 and the installation table 110 are common with those of the first exemplified embodiment.

In FIG. 12, the switch SW2 is a switch for changing-over the electrodes to which driving voltages of 2-poles 4-contacts are to be applied and a common terminal S00 of the first circuit C1 is connected to the first output terminal 83 of the feedback oscillator 112 on a steady basis. Also, the second output terminal 84 of the feedback oscillator 112 is connected to the common electrode 54c of the piezoelectric element 20.

A terminal S01 is connected to the driving electrode 54a and the terminal S02 is connected with the driving electrode 54b. Also, an input terminal 114 of the feedback oscillator 112 is connected to a common terminal S10 of the second circuit C2 of the switch SW2.

A terminal S11 is provided at the midpoint of the resistors R11 and R12 which are connected between the driving electrode 54b and a ground terminal 115. A terminal S12 is provided at the midpoint of the resistors R21 and R22 which are connected between the driving electrode 54a and a ground terminal 116.

The oscillation frequency of the feedback oscillator 112 is set to be the resonance frequency of the piezoelectric elements 20a, 20b.

Here, each of the series resistance value of the resistors R11, R12 and the series resistance value of the resistors R21, R22 is made to be such a high resistance value by which either one of the driving electrode 54a and the driving electrode 54b, to which the driving voltage is not applied, becomes the opened state effectively. It should be noted that it is possible to arbitrarily select the resistance values of the voltage dividing resistors R12 and R22 such that a suitable voltage is to be fed-back to the feedback oscillator 112.

In this state, when the switch SW2 is turned to the upper side, the driving voltage is applied between the driving electrode 54a and the common electrode 54c, and the first vibrator area 51 is conducted electrically. On the other hand, the driving electrode 54b is connected to the ground terminal 115 and the second vibrator area 52 is opened. Thus, the first vibrator area 51 resonates in the surface-spreading direction and the vibration end portion 23a vibrates in the approaching and separating direction with respect to the fixed portion 30a. In the phase in which the first vibrator area 51 is stretched and the vibration end portion 23a moves toward the direction apart from the fixed portion 30a (lower left direction in the same drawing), the contact element 60 is depressed onto the biasing surface 102 of the movable element 100 and concurrently, drives the movable element 100 toward the left side direction. In the phase in which the first vibrator area 51 is contracted and the vibration end portion 23a moves toward the direction approaching to the fixed portion 30a (upper right direction in the same drawing), a portion or the whole of the biasing force to the biasing surface 102, which is applied to the contact element 60 by the elastic member 34, is cancelled. Thus, it never happens that the movable element 100 moves toward the reverse direction (right side direction) in the aforesaid phase. Consequently, the movable element 100 is driven toward the left side direction unilaterally by the resonating first vibrator area 51.

On the other hand, when the switch SW2 is turned to the lower side, the driving voltage is applied between the driving electrode 54b and the common electrode 54c, and the second vibrator area 52 is conducted electrically. On the other hand, the driving electrode 54a is connected to the ground terminal 116 and the first vibrator area 51 is opened. Thus, the second vibrator area 52 resonates in the surface-spreading direction and the vibration end portion 23b vibrates in the approaching and separating direction with respect to the fixed portion 30b. Consequently, the contact element 60 drives the movable element 100 toward the right side direction unilaterally.

In other words, according to the ultrasonic motor 10 of this exemplified embodiment, it is possible only by changing-over the switch SW2 to move the movable element 100 selectively toward the right and left directions.

In the ultrasonic motor 10 of this exemplified embodiment, the opened driving electrode 54a or 54b is connected to the input terminal 114 through the common terminal S10 and becomes a feedback electrode for the self-excitation oscillation circuit 80. Thus, even in a case in which the resonance frequency of the piezoelectric elements 20a, 20b is changed by the change of the mechanical load state and by the change in the ambient temperature, the resonance frequency thereof is pursued automatically, so that it is possible to constitute a stable oscillation circuit 80.

<Fifth Exemplified Embodiment>

Figure 13:
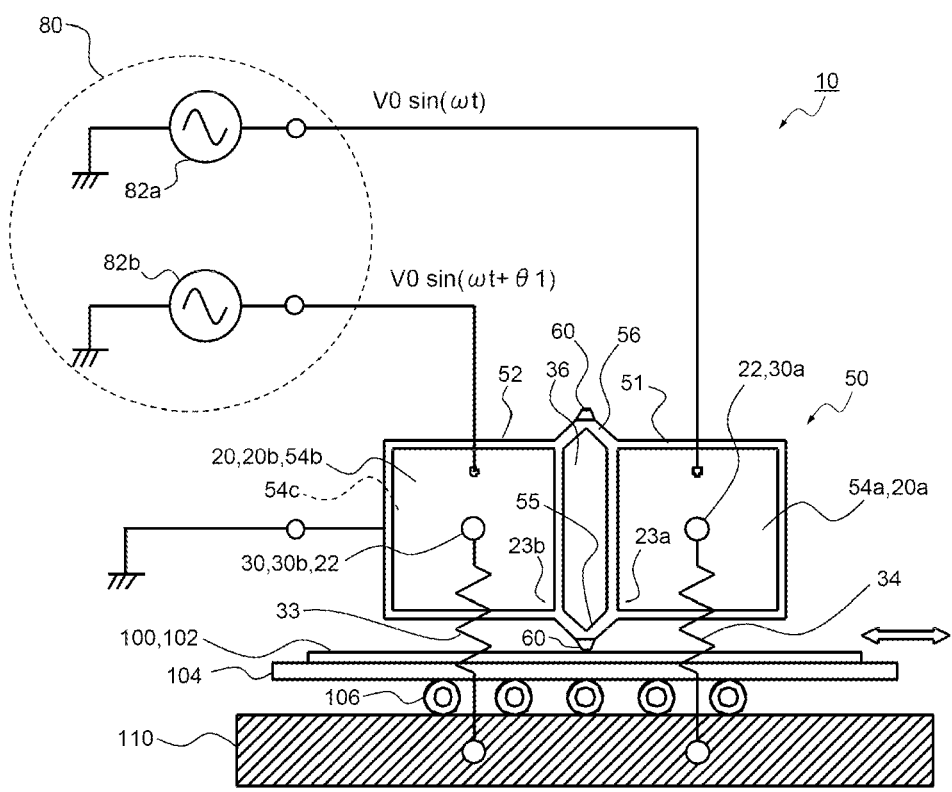
FIG. 13 is a schematic diagram showing a structure of an ultrasonic motor relating to a fifth exemplified embodiment.

FIG. 13 is a schematic diagram showing a structure of an ultrasonic motor 10 of this exemplified embodiment. The ultrasonic motor 10 of this exemplified embodiment is a motor which drives the movable element 100 by using the vibrator 50 of the second exemplified embodiment shown in FIG. 7A. The elastic members 33, 34, the movable element 100, the base plate 104, roller 106 and the installation table 110 are common with the first exemplified embodiment. In FIG. 13, there is shown a state in which the coupling portion 55 is disposed on the lower side in the drawing, the contact element 60 is made to abut the biasing surface 102 and the movable element 100 is driven in the right & left direction.

The application means (oscillation circuit 80) of this exemplified embodiment applies an AC voltage to the piezoelectric element 20a of the first vibrator area 51. Then, simultaneously, another AC voltage whose phase is different from that of this AC voltage is applied with respect to the piezoelectric element 20b of the second vibrator area 52. Thus, the contact element 60 provided at the coupling portion 55 moves circularly or moves elliptically.

Here, "the oscillation circuit 80 applies AC voltages to the piezoelectric element 20a and to the piezoelectric element 20b simultaneously" means that at least a portion of the application time period with respect to the piezoelectric element 20a and a portion of the application time period with respect to the piezoelectric element 20b are overlapped each other.

It is assumed that the oscillation circuit 80 of this exemplified embodiment applies a sinusoidal voltage as the AC voltage. The oscillation circuit 80 is provided with two oscillators 82a, 82b. The sinusoidal voltage (first voltage) which the oscillator 82 applies to the piezoelectric element 20a is expressed by $V0·\sin(\omega t)$. The oscillator 82 applies a sinusoidal voltage (second voltage) expressed by $V0·\sin(\omega t+\theta 1)$ to the piezoelectric element 20b as another AC voltage whose phase is different from that of this sinusoidal voltage. In other words, the second voltage has a phase advanced by $+\theta 1$ with respect to that of the first voltage.

Each of the resonance frequencies of the surface-spreading directions of the first vibrator area 51 and the second vibrator area 52 is $\omega/2\pi$ and common. Therefore, the piezoelectric elements 20a, 20b resonate in the surface-spreading directions respectively by the applications of the first voltage and the second voltage. There exists a phase difference ($\theta 1$) between the resonance of the piezoelectric element 20a and the resonance of the piezoelectric element 20b. The vibration end portions 23a, 23b which correspond to the vertexes of the rectangular piezoelectric elements 20a, 20b are the vibrating positions which approach and separate with respect to the fixed portions 30 in the resonance modes in these surface-spreading directions. The vibration end portions 23a, 23b are coupled together locally and the coupling portion 55 is formed by being bent in a hook shape. The contact element 60 is provided at the vertex of the hook shaped coupling portion 55.

In the resonance mode in the surface-spreading direction of the piezoelectric element 20, the vibrating direction of the vibration end portion 23a and the vibrating direction of the vibration end portion 23b have a relation of intersecting with each other. Then, there exists the phase difference ($\theta 1$) in the resonances of the vibration end portions 23a, 23b as mentioned above. For this reason, the vibrations of the vibration end portions 23a, 23b are synthesized and it becomes a situation in which the contact element 60 moves circularly or moves elliptically.

Figure 14A:
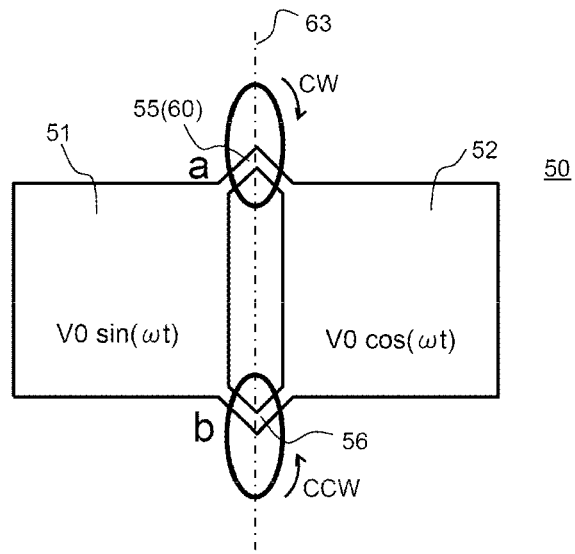
FIG. 14A is a schematic diagram showing a displacement direction of the contact element in a case in which the phase of the sinusoidal voltage applied to the second vibrator area is made to advance by 90 degrees compared with that of the first vibrator area.
Figure 14B:
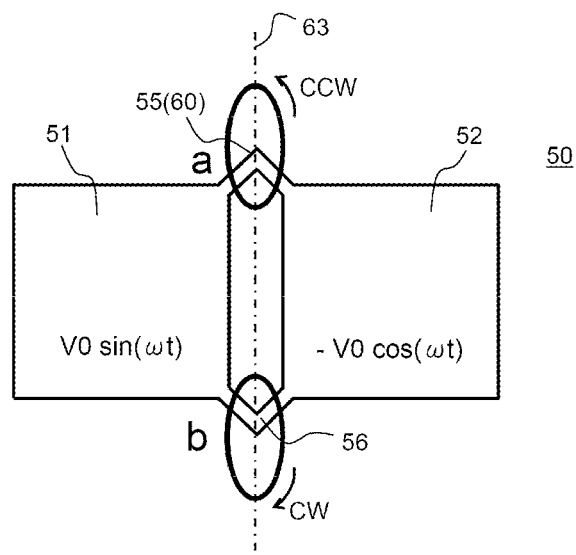
FIG. 14B is a schematic diagram showing a displacement direction of the coupling portion in case of changing the phase of the sinusoidal voltage.

FIG. 14A and FIG. 14B are schematic diagrams showing displacement directions of the coupling portions 55, 56 in case of changing the phase of the sinusoidal voltage. Specifically, FIG. 14A is a schematic diagram showing a displacement direction of the contact element 60 in a case in which the phase of the sinusoidal voltage applied to the second vibrator area 52 is made to advance by 90 degrees compared with the phase of the sinusoidal voltage applied to the first vibrator area 51. On the other hand, FIG. 14B is a schematic diagram showing a displacement direction of the contact element 60 in a case in which the phase of the sinusoidal voltage applied to the second vibrator area 52 is made to delay by 90 degrees compared with the phase of the sinusoidal voltage applied to the first vibrator area 51. The loci of the contact element 60 in the resonance mode of the surface-spreading direction are indicated by bold lines. The loci of the contact element 60 of the first coupling portion 55 notified by "a" and of the contact element 60 of the second coupling portion 56 notified by "b" in the respective drawings draw ellipses (or circles) as shown in the drawings. One of the long axis and the short axis in each of these ellipses lies on a boundary line 63 (shown by a dashed-dotted line in each drawing) which separates the first vibrator area 51 and the second vibrator area 52. The boundary line 63 is a line connecting the first coupling portion 55 and the second coupling portion 56. The vibrator 50 of this exemplified embodiment has a mirror symmetric shape with respect to the boundary line 63.

Here, it is assumed that the first voltage applied to the first vibrator area 51 is $V0·\sin(\omega t)$ and the second voltage applied to the second vibrator area 52 is $V0·\sin(\omega t+90°)=V0·\cos(\omega t)$. At that time, as shown in FIG. 14A, the first coupling portion 55 moves elliptically clockwise (CW) in the drawing and the second coupling portion 56 moves elliptically counterclockwise (CCW).

Then, when the second voltage applied to the second vibrator area 52 is made to be $V0·\sin(\omega t-90°)=-V0·\cos(\omega t)$ by reversing the phase difference ($\theta 1$), the rotational directions of the coupling portions 55, 56 are reversed. Specifically, as shown in FIG. 14B, the first coupling portion 55 moves elliptically counterclockwise (CCW) in the drawing and the second coupling portion 56 moves elliptically clockwise (CW).

It should be noted that there is no limitation in particular for the phase difference ($\theta 1$) if it is a difference between $-\pi$ and $+\pi$. By employing a configuration in which the first connection portion 55a and the second connection portion 55b (see FIG. 7B) have different lengths or different rigidities, it is possible to move the contact element 60 elliptically even if the phase difference ($\theta 1$) between the resonances of the first vibrator area 51 and the second vibrator area 52 is zero.

The application means (oscillation circuit 80) of this exemplified embodiment reverses the positive/negative sign of the phase difference (θ1) between the AC voltage (first voltage) and the another AC voltage (second voltage) or increases & decreases that phase difference. Then, the rotational direction of the circular movement or the elliptic movement of the contact element 60 is reversed, or the locus of the circular movement or the elliptic movement 1 thereof is changed.

To be more precise, the oscillation circuit 80 is provided with phase difference adjusting means (not shown) for arbitrarily adjusting the phase difference (θ1) between the AC voltages outputted from the oscillators 82a, 82b respectively. Then, the rotational direction of the contact element 60 is reversed when reversing the positive/negative sign of the phase difference (θ1) (+θ1→−θ1), so that the transferring direction of the movable element 100 is changed over. Also, by adjusting the phase difference (θ1) increasingly and decreasingly, an eccentricity of the locus of the circular movement or the elliptic movement of the contact element 60 is changed, so that it is possible to adjust the feeding speed of the movable element 100 freely by varying the tempo or speed thereof.

Figure 15:
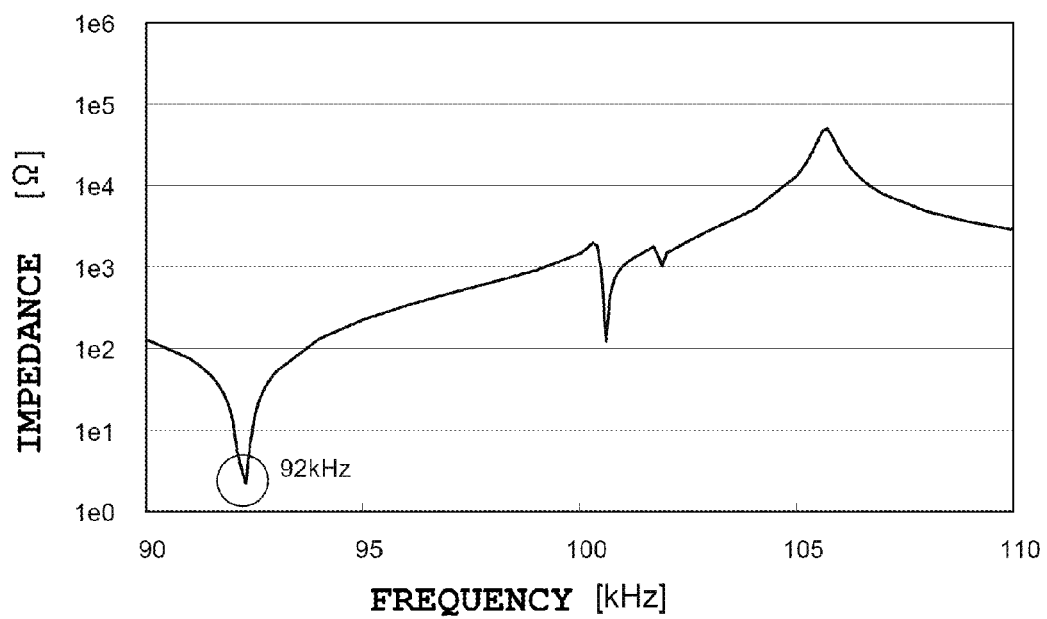
FIG. 15 is a diagram showing an example of the simulation result relating to the frequency characteristic of the impedance of the piezoelectric element in the fifth exemplified embodiment.

FIG. 15 is a diagram showing an example of the simulation result relating to the frequency characteristic of the impedance of the piezoelectric element in this exemplified embodiment. For the simulation condition, the external dimensions of the piezoelectric element 20 composed of a piezoelectric ceramic were made to be such that width is 43 mm, height is 20 mm and thickness is 2 mm. The concave portion 36 in the center of the piezoelectric element 20 was made to be the through-slit and the slit width was made to be 3 mm. Also, the angle θ for the first connection portion 55a and the second connection portion 55b, which is shown in FIG. 7B, was set to be 30 degrees. Then, the areas, each having a 10 mm square, were made to be areas of the first vibrator area 51 and the second vibrator area 52 respectively.

With respect to such a piezoelectric element 20, a sinusoidal voltage was applied to the first vibrator area 51 as a first voltage and a second voltage whose phase difference is +90 degrees with respect to the first voltage was applied to the second vibrator area 52. Then, the impedance of the piezoelectric element 20 was simulated while changing these frequencies simultaneously. At that time, the rigidities of the fixed portion 30, the contact element 60, the driving electrodes 54a, 54b and the common electrode 54c (see FIG. 13) were ignored.

As shown in FIG. 15, the impedance of the piezoelectric element 20 became a minimum value at the frequency of 92 kHz.

FIG. 16A to FIG. 16D are displacement-mode views which are obtained by FEM-analyzing the piezoelectric element 20 in a state in which the sinusoidal voltage (first voltage) of this resonance frequency is applied to the first vibrator area 51 and the abovementioned second voltage is applied to the second vibrator area 52. Similarly as FIG. 5, in the displacement-mode view, the position in which the amount of displacement is large is shown by a deep color and the position in which the amount of displacement is small is shown by a light color.

Figure 16A:
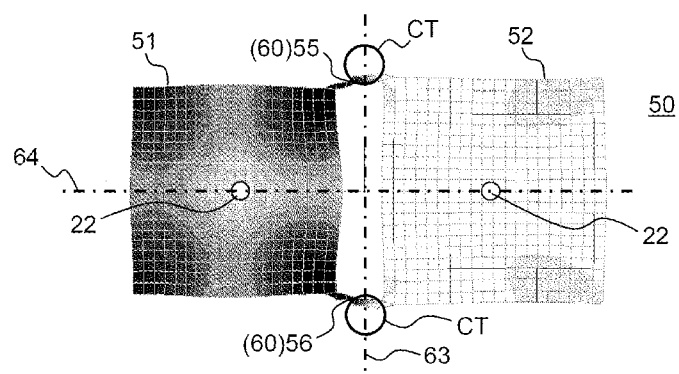
FIGS. 16A to 16D are displacement-mode views of the piezoelectric element at the resonance frequency.

FIG. 16A shows a maximum contractible deformation state in which the first vibrator area 51 is contracted centered on the surface-center portion 22 in the inside of the plane surface. At that time, the absolute value of the first voltage is at the maximum (V0). The surface-center portion 22 is the gravity center of the first vibrator area 51 and is the area at which the fixed portion 30 is arranged in the ultrasonic motor 10 (see FIG. 13).

At that time, the displacement of the second vibrator area 52 is approximately zero. This is because it becomes a state in which the absolute value of the second voltage is zero due to the fact that the phase of the second voltage, which is applied to the second vibrator area 52, advances as much as 90 degrees compared with that of the first voltage.

The line which passes the mutual surface-center portions 22 of the first vibrator area 51 and the second vibrator area 52 is indicated by a dashed-dotted line as a center line 64. The boundary line 63 separating the first vibrator area 51 and the second vibrator area 52 is orthogonal to the center line 64. In a state shown in FIG. 16A, the first coupling portion 55 and the second coupling portion 56 are displaced toward the side of the first vibrator area 51 compared with the boundary line 63.

The contact elements 60 of the first coupling portion 55 and the second coupling portion 56 are moved circularly respectively. The loci CT of the circular movements are indicated by bold lines.

Figure 16B:
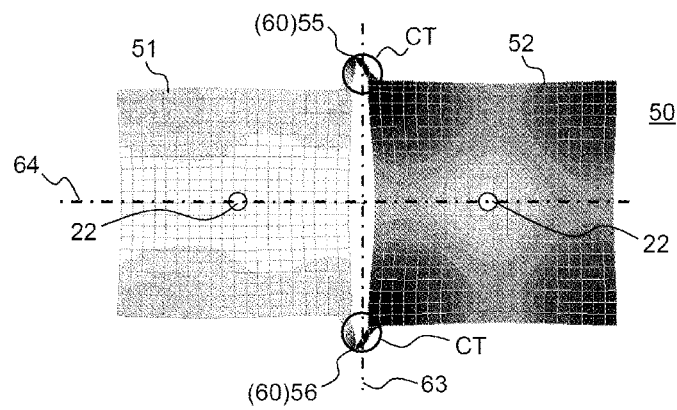

FIG. 16B shows a displacement mode in which the phase advances by 90 degrees from the state shown in FIG. 16A. FIG. 16B shows a state of maximum expandable deformation in which the second vibrator area 52 is stretched centered on the surface-center portion 22 in the inside of the plane surface. At that time, the absolute value of the first voltage is zero and the displacement of the first vibrator area 51 is approximately zero. Therefore, the first coupling portion 55 and the second coupling portion 56 are displaced toward the side of the first vibrator area 51 compared with the boundary line 63.

Figure 16C:
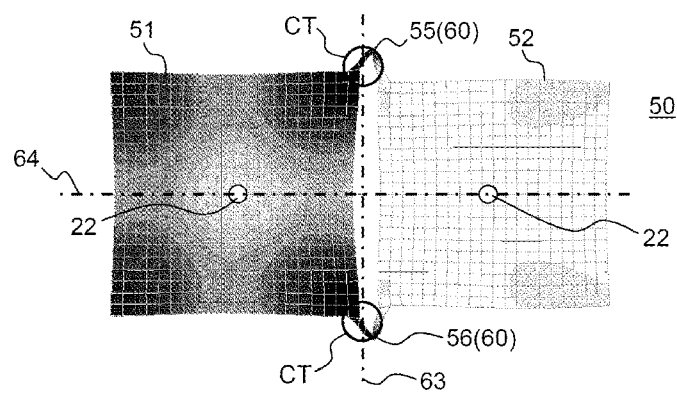

FIG. 16C shows a displacement mode in which the phase advances further by 90 degrees from the state shown in FIG. 16B. In FIG. 16C, the absolute value of the second voltage becomes zero again and the displacement of the second vibrator area 52 becomes approximately zero. On the other hand, the first vibrator area 51 is in a state of maximum expandable deformation by being stretched centered on the surface-center portion 22 in the inside of the plane surface. Therefore, the first coupling portion 55 and the second coupling portion 56 are displaced toward the side of the second vibrator area 52 compared with the boundary line 63.

Figure 16D:
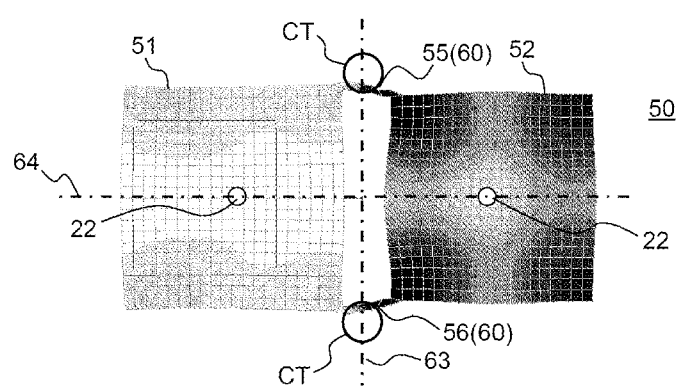

FIG. 16D shows a displacement mode in which the phase advances further by 90 degrees from the state shown in FIG. 16C. In FIG. 16D, the absolute value of the first voltage becomes zero again and the displacement of the first vibrator area 51 becomes approximately zero. The second vibrator area 52 is in a state of maximum contractible deformation by being contracted centered on the surface-center portion 22 in the inside of the plane surface. Therefore, the first coupling portion 55 and the second coupling portion 56 are displaced toward the side of the second vibrator area 52 compared with the boundary line 63.

As described above, as shown by FIG. 16A to FIG. 16D, it is comprehended that the contact element 60 of the first coupling portion 55 moves circularly clockwise and the contact element 60 of the second coupling portion 56 moves circularly counterclockwise.

For the ultrasonic motor 10 of this exemplified embodiment using such a piezoelectric element 20, there are provided the first coupling portion 55 and the second coupling portion 56 on both sides of the line (center line 64) connecting fixed portion 30a of the first vibrator area 51 and the fixed portion 30b of the second vibrator area 52. At the first coupling portion 55 and the second coupling portion 56, there are provided the contact elements 60 respectively. Then, the rotational direction of the circular movement or the elliptic movement of the contact element 60 of the first coupling portion 55 and the rotational direction of the circular movement or the elliptic movement of the contact element 60 of the second coupling portion 56 are opposite to each other. It is possible for the ultrasonic motor 10 of this exemplified embodiment to drive the contact element 60 of the first coupling portion 55 and the contact element 60 of the second coupling portion 56, which are the driving portions provided at a plurality of places, simultaneously. Therefore, it is possible to drive the plurality of pieces of movable elements 100 simultaneously and in addition, it is also possible to bias and drive different two places of one single movable element 100 simultaneously.

By adjusting the phase difference ($\theta 1$) between the output signals of the oscillators 82a, 82b shown in FIG. 13, it is possible for the ultrasonic motor 10 of this exemplified embodiment to vary the locus drawn by the contact element 60. Also, the resonance frequencies of the first vibrator area 51 and the second vibrator area 52 are common by $\omega/2\pi$ and it is possible to use a single vibration mode. For this reason, the locus of the contact element 60 is invariable even if this resonance frequency is changed by the temperature and the mechanical load when operating the ultrasonic motor 10, so that it is possible to drive the movable element 100 stably.

Also, as clear from the displacement-mode view of the respective drawings of FIG. 16, the surface-center portions 22 of the first vibrator area 51 and the second vibrator area 52 become fixed points having small vibrational amplitudes concurrently, so that it is possible to form the fixed portions 30 in the ultrasonic motor 10 at the both surface-center portions 22. For this reason, it is possible to fix the ultrasonic motor 10 stably by a plurality of points with respect to the housing 90 (see FIG. 11).

<Sixth Exemplified Embodiment>

Figure 17:
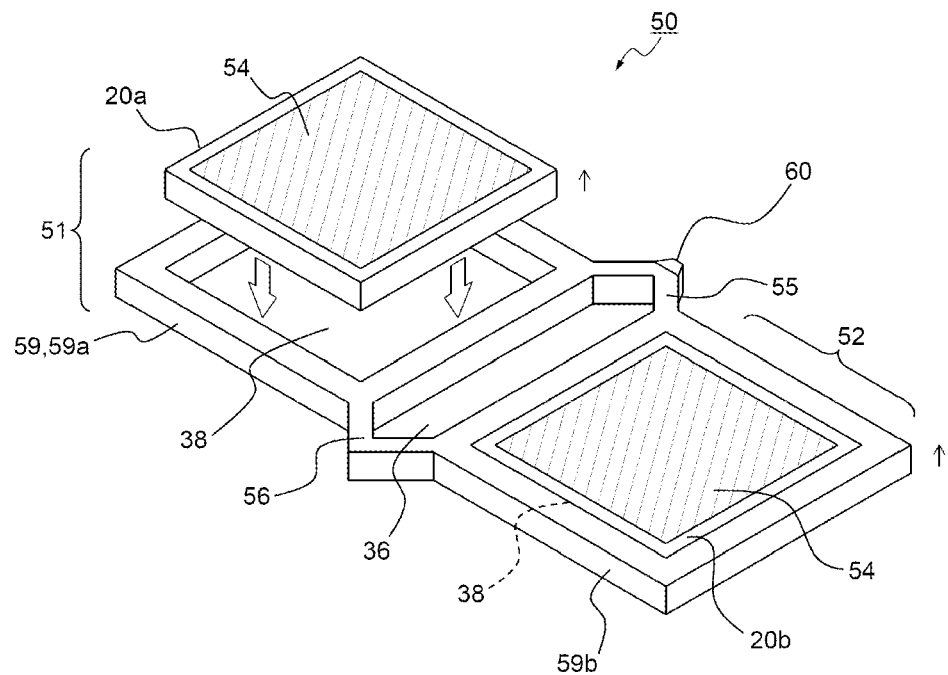
FIG. 17 is an exploded perspective view of a vibrator relating to a sixth exemplified embodiment.

FIG. 17 is an exploded perspective view of a vibrator 50 of this exemplified embodiment.

The vibrator 50 of this exemplified embodiment is provided with a first piezoelectric element 20a, a second piezoelectric element 20b, and a metal-made frame portion 59 including a coupling portion 55. The frame portion 59 has through-holes 38 for mounting the first piezoelectric element 20a and the second piezoelectric element 20b by fitting them therein respectively. On the main surfaces of the front and back surfaces of the first piezoelectric element 20a and the second piezoelectric element 20b, there are provided electrodes (driving electrodes 54) (electrodes on the rear surface side are omitted in the drawing).

The frame portion 59 is composed of a metal material such as stainless steel or the like. The frame portion 59 is provided with a pair of through-holes 38 and a through-slit (concave portion 36) arranged therebetween. In other words, the frame portion 59 has a configuration in which a pair of through-holes 38 and a through-slit (concave portion 36) are perforated in an approximately rectangular-shaped metal plate.

Each of the first piezoelectric element 20a and the second piezoelectric element 20b is an element which is formed by coating a driving electrode 54 onto the piezoelectric material polarized in the thickness direction. The polarization directions of both the piezoelectric elements are common as shown by arrows in FIG. 17. Each of the first piezoelectric element 20a and the second piezoelectric element 20b forms approximately a square shape. Each of the first piezoelectric element 20a and the second piezoelectric element 20b is fixed on the frame portion 59 by being fitted into the through-hole 38.

The frame portion 59 includes rectangular closed loop portions 59a, 59b and coupling portions 55, 56 for coupling the corner portions of these closed loop portions 59a, 59b each other. The first piezoelectric element 20a is fitted into the closed loop portion 59a and the second piezoelectric element 20b is fitted into the closed loop portion 59b.

Figure 18:
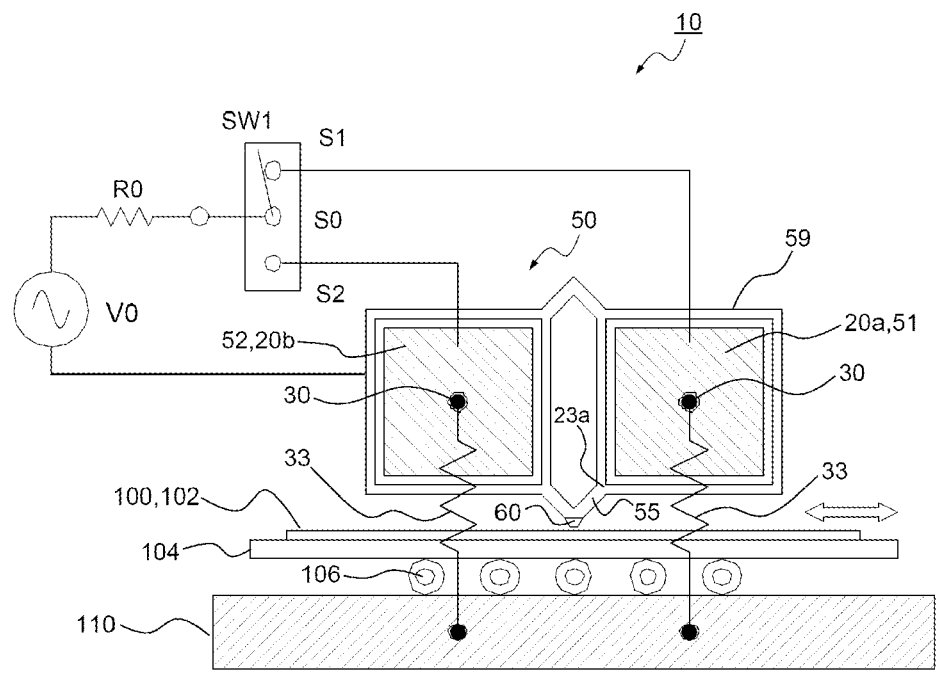
FIG. 18 is a schematic diagram showing a structure of an ultrasonic motor relating to the sixth exemplified embodiment.

FIG. 18 is a schematic diagram showing a structure of an ultrasonic motor 10 of this exemplified embodiment. The ultrasonic motor 10 of this exemplified embodiment is a motor which drives the movable element 100 by using the vibrator 50 shown in FIG. 17. The elastic members 33, 34, the movable element 100, the biasing surface 102, the base plate 104, the roller 106, the installation table 110 and the driving directions of the movable element 100 are common with those of the fifth exemplified embodiment.

Respective centers of the first piezoelectric element 20a and the second piezoelectric element 20b are made to be fixed portions 30 and the piezoelectric elements are fixed to the installation table 110 through the elastic members 33, 34. By the change-over operation of the switch SW1, the AC voltage V0 is applied to one of the first piezoelectric element 20a and the second piezoelectric element 20b (first piezoelectric element 20a in FIG. 18), and the other one (second piezoelectric element 20b in FIG. 18) is made to have open-circuit potential. The frequency of the AC voltage V0 is the resonance frequency in the surface-spreading direction of the first piezoelectric element 20a and the second piezoelectric element 20b. By the application of such an AC voltage V0, there occurs a surface-spreading vibration in the vibrator area (first vibrator area 51) including the abovementioned one piezoelectric element. Thus, the contact element 60 provided at the coupling portion 55, which corresponds to the portion at the center of the long side portion of the frame portion 59, receives a deformation drawing a locus in the oblique straight-line direction with respect to that long side direction (right & left direction in FIG. 18). This is because the contact element 60 is positioned approximately on an extended line in the direction of the diagonal line of the first vibrator area 51, which is formed by connecting the fixed portion 30 and the vibration end portion 23a.

The movable element 100 is driven by making such a contact element 60 contact with the movable element 100 which is installed freely movably in the linear direction or in the rotational direction (in the linear direction in FIG. 18). Then, by changing-over the electrical-supply state or the opened state for the first piezoelectric element 20a or for the second piezoelectric element 20b due to the operation of the switch SW1, the moving direction of the movable element 100 is changed over for the forward and reverse directions thereof.

According to the ultrasonic motor 10 of this exemplified embodiment, with regard to the first piezoelectric element 20a and the second piezoelectric element 20b, the four corners thereof are expanded and contracted in the radial directions by setting the surface-center portions thereof to be fixed points in the resonance modes of the surface-spreading directions. For this reason, it is possible to support and fix the ultrasonic motor 10 with respect to the installation table 110 stably by setting the aforesaid surface-center portions to be the fixed portions 30.

Also, the vibrator 50 of this exemplified embodiment employs a configuration in which the first piezoelectric element 20a is fitted into the closed loop portion 59a of the frame portion 59 and is fixed therein, so that the vibration end portion 23a which corresponds to the corner portion of the frame portion 59 is deformed flexibly in the surface-spreading direction. Therefore, it is possible to displace the contact element 60 by a sufficient stroke without a phenomenon in which the deformation at the time of resonance of the first piezoelectric element 20a is suppressed by the frame portion 59. Also, it is possible to achieve a low-profile designing of the thickness size of the ultrasonic motor 10 by a configuration of fitting the first piezoelectric element 20a into the frame portion 59. This aspect is similar also with regard to the second piezoelectric element 20b.

It should be noted in this exemplified embodiment that there was illustrated a configuration in which the AC voltage V0 is changed over and applied to the first piezoelectric element 20a and the second piezoelectric element 20b selectively by using a single oscillator, but the present invention is not limited by this configuration. As shown in the fifth exemplified embodiment, it is allowed to move the contact element 60 circularly or elliptically by applying sinusoidal voltages, which are outputted by a plurality of oscillators and whose phases are different from each other, to the first piezoelectric element 20a and the second piezoelectric element 20b respectively.

It should be noted that the present invention is not to be limited by the aforementioned exemplified embodiments and includes further embodiments such as various modifications, improvements and the like as long as the object of the present invention is achieved.

For example, in the abovementioned respective exemplified embodiments, there was exemplified a configuration in which each of the first vibrator area 51 and the second vibrator area 52 is fixed by a single point of the fixed portion 30a, 30b, but it is not limited by that configuration. It is allowed to fix each of the first vibrator area 51 and the second vibrator area 52 by a plurality of points. In this case, "a phenomenon that each of the vibration end portions 23a, 23b vibrates in the approaching and separating direction with respect to the fixed portion" means "a phenomenon that each of end portions vibrates in the approaching or separating direction with respect to one of the fixed portions of the aforesaid plurality of points or with respect to the gravity-center position of the fixed portions of that plurality of points". Also, in the abovementioned exemplified embodiments, there was exemplified a configuration in which two vibrator areas are arranged side by side laterally and in which AC voltages are applied thereto respectively, but it is not limited by that configuration. It is allowed to arrange three or more vibrator areas.

Also, in the abovementioned exemplified embodiments, there was exemplified a case in which the respective four corner portions of the first vibrator area 51 or the second vibrator area 52 are displaced simultaneously in the resonance mode of the surface-spreading direction, but the present invention is not limited by that configuration. It is allowed to employ a displacement mode in which only the vibration end portion 23a or the vibration end portion 23b, to which the coupling portion 55 is connected, resonates. Specifically, it is allowed to select the thickness of the piezoelectric element 20 at the vibration end portion 23a so as to be different from the thicknesses of the piezoelectric element 20 at the corner portions 23i to 23k. Thus, in the predetermined resonance frequency, it is possible to make only the vibration end portion 23a resonate solely in the surface-spreading direction and it is possible to heighten the energy conversion-efficiency furthermore.

The ultrasonic motor 10 of the abovementioned exemplified embodiments contain the following technical ideas.

(1) An ultrasonic motor characterized by including: a first vibrator area and a second vibrator area each of which includes a piezoelectric element polarized in the thickness direction and a fixed portion; application means for applying AC voltage to the piezoelectric elements respectively and for resonating the first vibrator area and the second vibrator area individually toward the surface-spreading directions thereof; a coupling portion for coupling the first vibrator area and the second vibrator area; and a contact element provided at the coupling portion, wherein the first vibrator area includes a first vibrating position which vibrates by the resonance in the approaching and separating direction with respect to the fixed portion of the first vibrator area, the second vibrator area includes a second vibrating position which vibrates by the resonance in the approaching and separating direction with respect to the fixed portion of the second vibrator area, and the coupling portion couples the first vibrating position and the second vibrating position.

(2) The ultrasonic motor described in the abovementioned (1) characterized in that the coupling portion includes a first connection portion extending from the first vibrating position toward the contact element; and a second connection portion extending from the second vibrating position toward the contact element, wherein the extending directions of the first connection portion and the second connection portion are intersected with each other.

(3) The ultrasonic motor described in the abovementioned (2), wherein the first connection portion and the second connection portion are coupled by being intersected with each other, and the coupling portion is formed by being bent in a hook shape.

(4) The ultrasonic motor described in any one the aforementioned (1) to (3), wherein the first vibrating position is a position at a peripheral portion of the first vibrator area, the second vibrating position is a position at a peripheral portion of the second vibrator area and also, the contact element is provided at a position at which the amount of displacement when the first vibrator area or the second vibrator area resonates in the surface-spreading direction becomes maximum.

(5) The ultrasonic motor described in any one of the abovementioned (1) to (4), wherein a concave portion is provided between the first vibrator area and the second vibrator area.

(6) The ultrasonic motor described in the abovementioned (5), wherein the first vibrator area and the second vibrator area form rectangular shapes neighboring to each other, and the concave portion is a slit shaped through-hole which is formed between the mutual sides of the first vibrator area and the second vibrator area adjacent to each other and which extends along the sides.

(7) The ultrasonic motor described in any one of the abovementioned (1) to (6), including the first and second piezoelectric elements; electrodes provided on the front and rear surfaces of the piezoelectric elements; and a metal-made frame portion including the coupling portion, wherein the frame portion includes a through-hole for fitting and mounting the first and second piezoelectric elements.

(8) The ultrasonic motor described in any one of the abovementioned (1) to (7), characterized in that the application means applies the AC voltage to the piezoelectric element of the first vibrator area and also, applies another AC voltage having a different phase from that of the AC voltage simultaneously to the piezoelectric element of the second vibrator area, whereby the contact element is made to move circularly or to move elliptically.

(9) The ultrasonic motor described in the aforementioned (8), characterized in that the application means includes phase difference adjusting means for reversing the positive/negative sign of the phase difference between the AC voltage and the another AC voltage or for increasing & decreasing the phase difference, and depending on an operation in which the phase difference adjusting means reverses the positive/negative sign of the aforesaid phase difference or increases & decreases the aforesaid phase difference, the rotational direction of the circular movement or the elliptic movement of the contact element is reversed, or the locus of the circular movement or the elliptic movement is changed.

(10) The ultrasonic motor described in the abovementioned (8) or (9), wherein there are provided the first coupling portion and the second coupling portion on both sides of a line which connects the fixed portion of the first vibrator area and the fixed portion of the second vibrator area, in which there are provided the contact elements for the first coupling portion and the second coupling portion respectively, and the rotational direction of the circular movement or the elliptic movement of the contact element of the first coupling portion and the rotational direction of the circular movement or the elliptic movement of the contact element of the second coupling portion are opposite to each other.

(Additional Note 1) The abovementioned ultrasonic motor, wherein the abovementioned first vibrating position and second vibrating position (maximum displacement portions) are positions at which the displacement component by the abovementioned resonance in the abovementioned approaching and separating direction becomes maximum.

(Additional Note 2) The abovementioned ultrasonic motor, further including biasing means for pressuring the abovementioned contact element to the movable element.

(Additional Note 3) The abovementioned ultrasonic motor, wherein the abovementioned first vibrator area and the abovementioned second vibrator area have approximately the same rectangular shapes, square shapes or circular shapes each other.

(Additional Note 4) The abovementioned ultrasonic motor, characterized in that the shapes of the displacement modes of the abovementioned first vibrator area and the abovementioned second vibrator area caused by the resonances in the abovementioned surface-spreading directions are formed by setting the surface-center portions of the abovementioned piezoelectric elements to be the fixed points and by setting the peripheral portion to be the maximum displacement points.

(Additional Note 5) The abovementioned ultrasonic motor, further including a housing for housing the abovementioned first connection portion and the above-mentioned second connection portion and concurrently, wherein the abovementioned fixed portion fixes the abovementioned fixed points on the abovementioned housing.

(Additional Note 6) The abovementioned ultrasonic motor, wherein the extending direction of the abovementioned first connection portion has a shallower angle than that of the abovementioned approaching and separating direction by making the alignment direction of the abovementioned first vibrator area and the above-mentioned second vibrator area as a reference direction.

(Additional Note 7) The abovementioned ultrasonic motor, characterized in that the abovementioned contact element is constituted at least on the front surface of the outside of the abovementioned coupling portion by being film-formed with a harder material than those of the abovementioned first connection portion and the abovementioned second connection portion.

(Additional Note 8) The abovementioned ultrasonic motor, wherein the abovementioned application means changes-over the AC voltage-application between the abovementioned first vibrator area and the abovementioned second vibrator area, whereby the displacement component in the abovementioned surface-spreading direction of the abovementioned contact element is reversed into the alignment direction between the abovementioned first vibrator area and the above-mentioned second vibrator area.

(Additional Note 9) There are included driving electrodes which are provided individually on one surfaces of the abovementioned first vibrator area and the abovementioned second vibrator area and which are applied with the above-mentioned AC voltage selectively by the abovementioned application means; and a common electrode which is formed on the other surface astride the abovementioned first vibrator area and the abovementioned second vibrator area and which is applied with the abovementioned AC voltage simultaneously.

(Additional Note 10) The abovementioned ultrasonic motor, wherein the abovementioned piezoelectric elements in the abovementioned first vibrator area and the abovementioned second vibrator area and the abovementioned coupling portion are formed integrally by a piezoelectric material and concurrently; there are laminated, on one surface of the abovementioned piezoelectric element, driving electrodes individually on the abovementioned first vibrator area and the abovementioned second vibrator area; and there is laminated, on the other surface of the above-mentioned piezoelectric element, a common electrode lying over the abovementioned first vibrator area and the abovementioned second vibrator area.

(Additional Note 11) The abovementioned ultrasonic motor, wherein there is included a metal-made base member lying over the abovementioned first vibrator area, the abovementioned second vibrator area and the abovementioned coupling portion; and the abovementioned first vibrator area and the abovementioned second vibrator area are constituted by a configuration in which the abovementioned piezoelectric elements formed with the application electrodes of the abovementioned AC voltage are joined with the abovementioned base member respectively.

(Additional Note 12) The abovementioned ultrasonic motor, wherein a concave portion extending in an intersecting direction with respect to the alignment direction of the abovementioned first vibrator area and the abovementioned second vibrator area is formed as a through-hole between the abovementioned first vibrator area and the abovementioned second vibrator area.

(Additional Note 13) The abovementioned ultrasonic motor, wherein the application means applies the AC voltage to the piezoelectric element of the first vibrator area or the piezoelectric element of the second vibrator area selectively, and reciprocates the contact element.

(Additional Note 14) The abovementioned ultrasonic motor characterized in that the locus of the reciprocating movement of the contact element changes by a configuration in which the application means changes-over the selection of the piezoelectric element to which the AC voltage is applied.

The invention claimed is:

1. An ultrasonic motor comprising: a first vibrator area and a second vibrator area each of which includes a piezoelectric element polarized in a thickness direction of the piezoelectric element and a fixed portion provided at a surface center of each of the first and second vibrator areas; application means for applying AC voltage to the piezoelectric elements respectively and for resonating the first vibrator area and the second vibrator area individually toward a surface-spreading direction thereof; a coupling portion for coupling the first vibrator area and the second vibrator area; and a contact element provided at the coupling portion, wherein the first vibrator area includes a first vibrating position which vibrates by resonance in an approaching and separating direction with respect to the fixed portion of the first vibrator area, the second vibrator area includes a second vibrating position which vibrates by the resonance in the approaching and separating direction with respect to the fixed portion of the second vibrator area, the coupling portion couples the first vibrating position and the second vibrating position, and a concave portion is provided between the first vibrator area and the second vibrator area.

2. The ultrasonic motor according to claim 1, wherein the coupling portion includes a first connection portion extending from the first vibrating position toward the contact element; and a second connection portion extending from the second vibrating position toward the contact element, wherein the extending directions of the first connection portion and the second connection portion are intersected with each other.

3. The ultrasonic motor according to claim 2, wherein the first connection portion and the second connection portion are coupled by being intersected with each other, and the coupling portion is formed by being bent in a hook shape.

4. The ultrasonic motor according to claim 1, wherein:
the first vibrating position is a position at a peripheral portion of the first vibrator area and at which the amount of displacement when resonating in the surface-spreading direction becomes maximum, and
the second vibrating position is a position at a peripheral portion of the second vibrator area and at which the amount of displacement when resonating in the surface-spreading direction becomes maximum.

5. The ultrasonic motor according to claim 1, wherein:
the first vibrator area and the second vibrator area form rectangular shapes neighboring to each other, and
the concave portion is a slit shaped through-hole which is formed between the mutual sides of the first vibrator area and the second vibrator area adjacent to each other and which extends along the sides.

6. The ultrasonic motor according to claim 1, comprising:
the first and second piezoelectric elements; electrodes provided on the front and rear surfaces of the piezoelectric elements; and a metal-made frame portion including the coupling portion, wherein:
the frame portion includes a through-hole for fitting and mounting the first and second piezoelectric elements.

7. The ultrasonic motor according to claim 1, wherein the application means applies the AC voltage to the piezoelectric element of the first vibrator area and also, applies another AC voltage having a different phase from that of the AC voltage simultaneously to the piezoelectric element of the second vibrator area, whereby the contact element is made to move circularly or to move elliptically.

8. The ultrasonic motor according to claim 7, wherein depending on an operation in which the application means reverses the positive/negative sign of the phase difference between the AC voltage and the another AC voltage or increases & decreases the phase difference, a rotational direction of circular movement or elliptic movement of the contact element is reversed, or a locus of the circular movement or the elliptic movement is changed.

9. The ultrasonic motor according to claim 7, wherein:
the coupling portion has first and second coupling portions,
the first coupling portion and the second coupling portion are provided on both sides of a line which connects the fixed portion of the first vibrator area and the fixed portion of the second vibrator area,
the contact element is provided at the first coupling portion and the second coupling portion respectively, and
a rotational direction of circular movement or elliptic movement of the contact element of the first coupling portion and a rotational direction of the circular movement or the elliptic movement of the contact element of the second coupling portion are opposite to each other.

10. The ultrasonic motor according to claim 2, wherein the application means applies the AC voltage to the piezoelectric element of the first vibrator area and also, applies another AC voltage having a different phase from that of the AC voltage simultaneously to the piezoelectric element of the second vibrator area, whereby the contact element is made to move circularly or to move elliptically.

11. The ultrasonic motor according to claim 3, wherein the application means applies the AC voltage to the piezoelectric element of the first vibrator area and also, applies another AC voltage having a different phase from that of the AC voltage simultaneously to the piezoelectric element of the second vibrator area, whereby the contact element is made to move circularly or to move elliptically.

12. The ultrasonic motor according to claim 1, wherein
the coupling portion has a first connection portion extending from the first vibrating position toward the contact element and a second connection portion extending from the second vibrating position toward the contact element, and
an extending direction of the first connection portion has a shallower angle than that of the approaching and separating direction by making an alignment direction of the first vibrator area and the second vibrator area as a reference direction.

13. The ultrasonic motor according to claim 2, wherein an extending direction of the first connection portion has a shallower angle than that of the approaching and separating direction by making an alignment direction of the first vibrator area and the second vibrator area as a reference direction.

14. The ultrasonic motor according to claim 3, wherein an extending direction of the first connection portion has a shallower angle than that of the approaching and separating direction by making an alignment direction of the first vibrator area and the second vibrator area as a reference direction.

15. The ultrasonic motor according to claim 1, wherein the applications means changes-over the AC voltage between the first vibrator area and the second vibrator area, whereby a displacement component in the surface-spreading direction of the contact element is reversed into an alignment direction between the first vibrator area and the second vibrator area.

16. The ultrasonic motor according to claim 2, wherein the application means changes-over the AC voltage between the first vibrator area and the second vibrator area, whereby a displacement component in the surface-spreading direction of the contact element is reversed into an alignment direction between the first vibrator area and the second vibrator area.

17. The ultrasonic motor according to claim 3, wherein the application means changes-over the AC voltage between the first vibrator area and the second vibrator area, whereby a displacement component in the surface-spreading direction of the contact element is reversed into an alignment direction between the first vibrator area and the second vibrator area.

18. The ultrasonic motor according to claim 1, wherein the concave portion extending in an intersecting direction with respect to an alignment direction of the first vibrator area and the second vibrator area is a through-hole.

19. The ultrasonic motor according to claim 2, wherein the concave portion extending in an intersecting direction with respect to an alignment direction of the first vibrator area and the second vibrator area is a through-hole.

20. The ultrasonic motor according to claim 3, wherein the concave portion extending in an intersecting direction with respect to an alignment direction of the first vibrator area and the second vibrator area is a through-hole.

* * * * *